United States Patent
Wu et al.

(10) Patent No.: US 11,881,782 B2
(45) Date of Patent: *Jan. 23, 2024

(54) MULTI-LEVEL DC-DC CONVERTER

(71) Applicant: pSemi Corporation, San Diego, CA (US)

(72) Inventors: Gary Chunshien Wu, San Diego, CA (US); David M. Giuliano, Brookline, MA (US); Gregory Szczeszynski, Hollis, NH (US)

(73) Assignee: pSemi Corporation, San Diego, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 17/376,918

(22) Filed: Jul. 15, 2021

(65) Prior Publication Data
US 2022/0006382 A1    Jan. 6, 2022

Related U.S. Application Data

(63) Continuation of application No. PCT/US2020/013414, filed on Jan. 13, 2020, which
(Continued)

(51) Int. Cl.
*H02M 3/158* (2006.01)
*H02M 1/08* (2006.01)
*H02M 1/00* (2006.01)

(52) U.S. Cl.
CPC .......... *H02M 3/1584* (2013.01); *H02M 1/08* (2013.01); *H02M 1/0054* (2021.05)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 5,706,188 A    1/1998 Meynard et al.
5,726,870 A    3/1998 Lavieville et al.
(Continued)

FOREIGN PATENT DOCUMENTS

CN    108712073    10/2018
EP    2930839    10/2015
(Continued)

OTHER PUBLICATIONS

Wu, et al., "Multi-Level DC-DC Converter with Boundary Transition Control", patent application filed in the USPTO on Jan. 16, 2019, U.S. Appl. No. 16/249,794, 75 pgs.
(Continued)

*Primary Examiner* — Jeffrey A Gblende
(74) *Attorney, Agent, or Firm* — JAQUEZ LAND GREENHAUS & McFARLAND LLP; John Land, Esq.

(57) ABSTRACT

Multi-level DC-to-DC converter circuits and methods that permit a full range of output voltages, including near and at zone boundaries. Embodiments alternate among adjacent or near-by zones, operating in a first zone for a selected time and then in a second zone for a selected time. Embodiments may include a parallel capacitor voltage balancing circuit that connects a capacitor to a source voltage to charge that capacitor, or couples two or more capacitors together to transfer charge, all under the control of real-time capacitor voltage measurements. Embodiments may include a lossless voltage balancing solution where out-of-order state transitions are allowed, thus increasing or decreasing the voltage across specific capacitors to prevent voltage overstress on the converter main switches. Restrictions may be placed on the overall sequence of state transitions to reduce or avoid transition state toggling, allowing each capacitor an opportunity to have its voltage steered as necessary for balancing.

19 Claims, 19 Drawing Sheets

Related U.S. Application Data is a continuation of application No. 16/249,794, filed on Jan. 16, 2019, now Pat. No. 10,720,842, and a continuation of application No. 16/249,805, filed on Jan. 16, 2019, now Pat. No. 10,770,974, and a continuation of application No. 16/249,796, filed on Jan. 16, 2019, now Pat. No. 10,720,843.

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H05B 39/048; B23K 11/24; H04B 2215/069

See application file for complete search history.

(56) References Cited

U.S. PATENT DOCUMENTS

| | | | |
|---|---|---|---|
| 5,737,201 | A | 4/1998 | Meynard et al. |
| 5,940,285 | A | 8/1999 | Carrere et al. |
| 5,969,960 | A | 10/1999 | Tachon et al. |
| 6,998,900 | B2 | 2/2006 | Kamijo |
| 7,471,532 | B1 | 12/2008 | Salama et al. |
| 8,743,553 | B2 | 6/2014 | Giuliano |
| 9,497,854 | B2 | 11/2016 | Giuliano |
| 9,559,589 | B2 * | 1/2017 | Petersen ............... H05B 45/38 |
| 9,608,512 | B2 * | 3/2017 | Zhak ..................... H02M 3/158 |
| 10,090,763 | B1 | 10/2018 | Mercer et al. |
| 10,333,477 | B2 * | 6/2019 | Salem ...................... H03F 3/72 |
| 10,404,154 | B2 | 9/2019 | Yosovich et al. |
| 10,720,842 | B1 | 7/2020 | Wu et al. |
| 10,720,843 | B1 * | 7/2020 | Wu ...................... H02M 3/1584 |
| 10,770,974 | B2 | 9/2020 | Wu et al. |
| 2011/0280052 | A1 | 11/2011 | Al-Haddad et al. |
| 2015/0009734 | A1 | 1/2015 | Stahl et al. |
| 2020/0099313 | A1 | 3/2020 | Huang et al. |
| 2020/0228014 | A1 | 7/2020 | Wu et al. |
| 2020/0228015 | A1 | 7/2020 | Wu et al. |
| 2020/0228016 | A1 | 7/2020 | Wu et al. |

FOREIGN PATENT DOCUMENTS

| | | |
|---|---|---|
| WO | 2015124514 | 8/2015 |
| WO | 2016137654 | 9/2016 |
| WO | 2017008140 | 1/2017 |
| WO | 2020150175 | 7/2020 |

OTHER PUBLICATIONS

Wu, et al., "Multi-Level DC-DC Converter with Lossy Voltage Balancing", patent application filed in the USPTO on Jan. 16, 2019, U.S. Appl. No. 16/249,796, 76 pgs.
Rosas-Caro, et al., "Novel DC-DC Multilevel Boost Converter", IEEE, Jul. 2008, pp. 2146-2151, 7 pgs
Butti, et al., "Novel High Efficiency Multilevel DC-DC Boost Converter Topologies and Modulation Strategies", Laboratory for High Power Electronic Systems, Proceedings of the 2011 14th European Conference on Power Electronics and Applications, 11 pgs.
Tran, Nguyen, Office Action received from the USPTO dated Oct. 18, 2019 for U.S. Appl. No. 16/249,796, 20 pgs.
Nguyen, Matthew Van, Office Action received from the USPTO dated Oct. 30, 2019 for U.S. Appl. No. 16/249,794, 12 pgs.
Tran, Nguyen, Notice of Allowance received from the USPTO dated Jan. 30, 2020 for U.S. Appl. No. 16/249,796, 9 pgs.
Nguyen, Matthew Van, Notice of Allowance received from the USPTO dated Feb. 21, 2020 for U.S. Appl. No. 16/249,794, 9 pgs.
Nguyen, Matthew Van, Notice of Allowance received from the USPTO dated May 8, 20 for U.S. Appl. No. 16/249,794, 12 pgs.
Tran, Nguyen, Notice of Allowance received from the USPTO dated May 14, 2020 for U.S. Appl. No. 16/249,796, 13 pgs.
Van Der Weiden, Ad, International Search Report and Written Opinion received from the EPO dated Jun. 9, 2020 for appln. No. PCT/US2020/013414, 10 pgs.
Mata, Sara M., Office Action received from the USPTO dated Dec. 27, 2019 for U.S. Appl. No. 16/249,805, 29 pgs.
Mata, Sara M., Notice of Allowance received from the USPTO dated May 20, 2020 for U.S. Appl. No. 16/249,805, 21 pgs.
Van Der Weiden, Ad, Written Opinion received from the EPO dated Dec. 4, 2020 for appln. No. PCT/US2020/013414, 29 pgs.
Van Der Weiden, Ad, International Preliminary Report on Patentability received from the EPO dated Apr. 15, 2021 for appln. No. PCT/US2020/013414, 41 pgs.

* cited by examiner

3-Level Zone Voltage Ranges

3-Level State Transitions

4-Level Zone Voltage Ranges

4-Level State Transitions

5-Level Zone Voltage Ranges

5-Level State Transitions

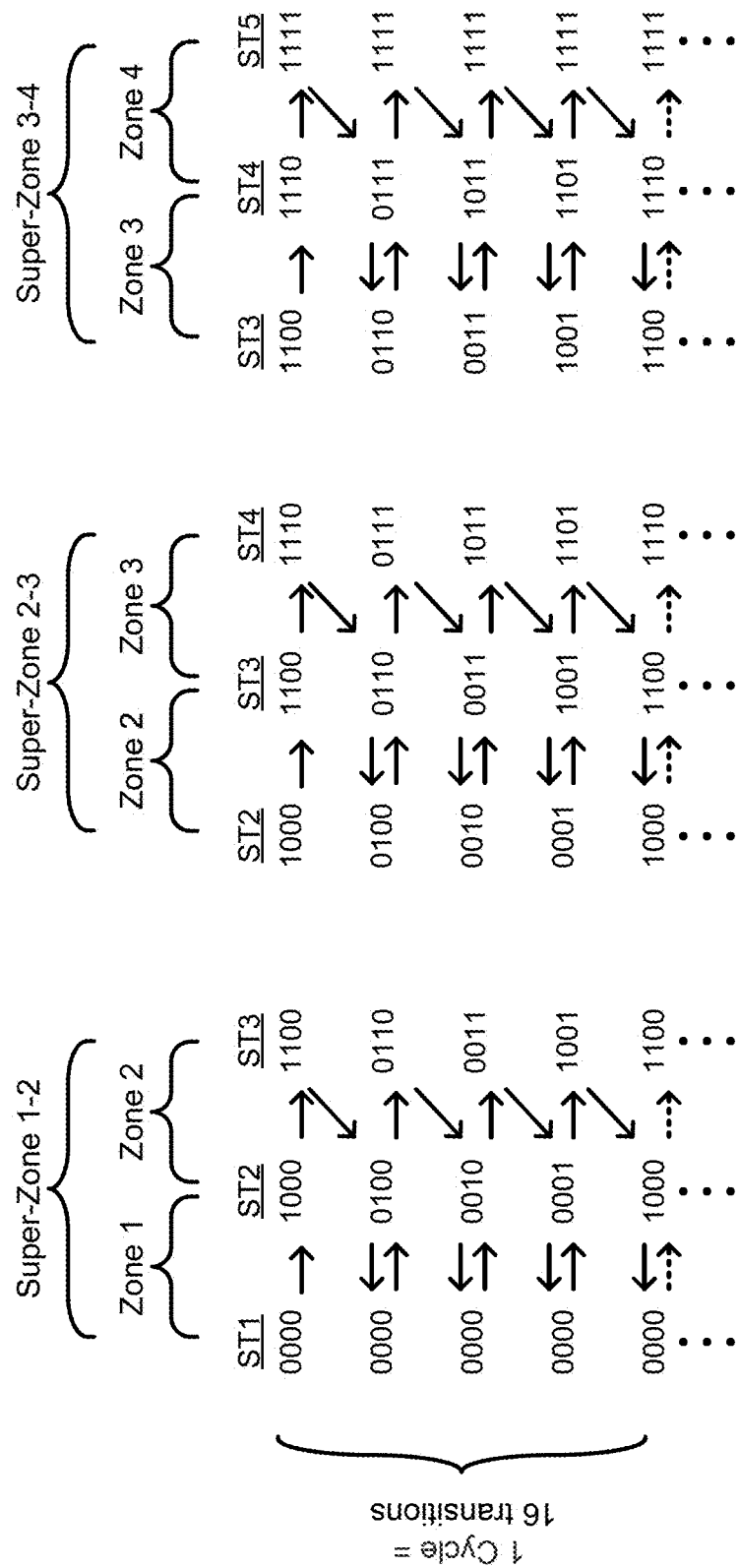

MULTI-LEVEL DC-DC CONVERTER

CROSS-REFERENCE TO RELATED APPLICATIONS AND CLAIM OF PRIORITY

The present application is a continuation application of PCT application PCT/US2020/013414 filed on Jan. 13, 2020 and incorporated herein by reference in its entirety, which PCT application is, in turn, a continuation application of each of the following patent applications, all assigned to the assignee of the present invention, the contents of all of which are incorporated by reference in their entirety:

U.S. patent application Ser. No. 16/249,794, filed on Jan. 16, 2019, entitled "Multi-Level DC-DC Converter with Boundary Transition Control", now U.S. Pat. No. 10,720,842 issued on Jul. 21, 2020;

U.S. patent application Ser. No. 16/249,796, filed on Jan. 16, 2019, entitled "Multi-Level DC-DC Converter with Lossy Voltage Balancing", now U.S. Pat. No. 10,720,843 issued on Jul. 21, 2020; and U.S. patent application Ser. No. 16/249,805, filed on Jan. 16, 2019, entitled "Multi-Level DC-DC Converter with Lossless Voltage Balance", now U.S. Pat. No. 10,770,974 issued on Sep. 8, 2020.

BACKGROUND

(1) Technical Field

This invention relates to electronic circuits, and more particularly to multi-level DC-to-DC converter circuits.

(2) Background

Many electronic products, particularly mobile computing and/or communication products and components (e.g., notebook computers, ultra-book computers, tablet devices, LCD and LED displays) require multiple voltage levels. For example, radio transmitter power amplifiers may require relatively high voltages (e.g., 12V or more), whereas logic circuitry may require a fairly low voltage level (e.g., 1-2V). Still other circuitry may require an intermediate voltage level (e.g., 5-10V). Further, some electronic components, such as LCD and LED displays, may need a variable voltage level to allow for different light intensity levels, such as from dim to bright.

It is common to use DC-to-DC converters to generate a lower or higher DC voltage from a DC power source, such as a battery. DC-to-DC converters which generate intermediate and/or low voltage levels from a higher voltage DC power source are commonly known as buck converters, so-called because $V_{OUT}$ is less than VIN, and hence the converter is "bucking" the input voltage. DC-to-DC converters which generate higher voltage levels than a DC power source are commonly known as boost converters, because $V_{OUT}$ is greater than $V_{IN}$. Some DC-to-DC converter circuits can output multiple output voltages and can be configured as both a buck or a boost converter, with the mode of operation being selectable by control circuitry.

For example, FIG. 1 is a schematic diagram of one type of inductor-based prior art two-level inverting buck-boost converter circuit 100. Two switches, designated by their respective clock signals $\varphi_{11}$ and $\varphi_{12}$, are series coupled between a DC input having a voltage $V_1$ and a DC output having a voltage $V_2$. Inductor L1 is coupled in a shunt configuration between switches $\varphi_{11}$ and $\varphi_{12}$. The switches may be, for example, electronic switches such as field effect transistors, particularly MOSFETs. Clock signals $\varphi_{11}$ and $\varphi_{12}$ are complementary and are provided by a clock/control circuit (not shown), in known fashion. The clocking duty cycle—the ratio of clock signal $\varphi_{11}$ being ON versus OFF—determines the momentary voltage across the inductor L1, and hence the average voltage $V_2$ at the output of the circuit (other circuitry, not shown, may be used to smooth out $V_2$). The output voltage $V_2$ can be expressed in terms of $V_1$ and the duty cycle DC as:

$$V_2 = -V_1 \times [DC/(1-DC)] \qquad [\text{EQ. 1}]$$

For example, if $V_1$ is 5V, and the duty cycle is 40% (0.4), then $V_2$ equals −3.33V, whereas if the duty cycle is 60% (0.6), then $V_2$ equals −7V. The inductor L1 of the inverting buck-boost converter of FIG. 1 is thus exposed to two voltage levels ($V_1$ and $V_2$) and has two switching states ($\varphi_{11}$ ON and $\varphi_{12}$ OFF, or $\varphi_{11}$ OFF and $\varphi_{12}$ ON), and is generally considered to be a "2-level converter".

A problem with the circuit configuration of FIG. 1 is that the minimum inductor size is limited by the maximum values of the difference between $V_1$ and $V_2$, and the lowest switching frequency for the inductor L1. The greater the voltage difference and the lower the frequency, the larger the inductor needs to be. Further, for some technologies (e.g., low voltage CMOS), the capability of each switch $\varphi_{11}$, $\varphi_{12}$ to withstand OFF state voltages is a limiting factor for the range of input voltages.

Accordingly, there is a need for DC-to-DC converter circuits and related methods that allow for a smaller minimum inductor size while permitting a full range of output voltages. There is also a need for related circuits and methods that avoid voltage overstress of the switch transistors. The present invention addresses these needs and more.

SUMMARY

The present invention encompasses multi-level DC-to-DC converter circuits and related methods that permit a full range of output voltages across all operational zones. Embodiments allow generation of output voltages very close to and at the boundaries of each zone. Some embodiments include circuits and methods that allow balancing of capacitor voltages and avoidance of voltage overstress of the converter circuit switch transistors at startup and during operation.

More particularly, in order to generate output voltages very close to and at the boundaries of each zone, embodiments of the present invention essentially alternate (toggle) among adjacent (or even near-by) zones. Accordingly, a multi-level DC-to-DC converter circuit in accordance with this aspect of the invention would operate in a first zone for a selected time and then in a second zone for a selected time before transitioning back to the first zone. Thus, the two zones are treated as a single "super-zone".

Some embodiments of multi-level DC-to-DC converter circuits include a parallel "shadow" capacitor voltage balancing circuit that connects a capacitor to a source voltage to charge that capacitor, or couples two or more capacitors together to transfer charge from a higher voltage capacitor to a lower voltage capacitor, all under the control of real-time capacitor voltage measurements. Capacitor voltages are restored to target voltages in real time, thus preventing the FET switches from seeing excessive high voltages. In addition, the "shadow" capacitor voltage balancing circuit may be used to pre-charge the DC-to-DC converter capacitors at a relatively slow and even rate such that the capacitor voltages rise proportionally, thus preventing voltage overstress on the main switches of the DC-to-DC converter.

Some embodiments use a lossless voltage balancing solution where out-of-order state transitions of a multi-level DC-to-DC converter circuit are allowed to take place during normal operation. The net effect of out-of-order state transitions is to increase or decrease the voltage across specific capacitors, thus preventing voltage overstress on the main switches of the DC-to-DC converter. In some embodiments, restrictions are placed on the overall sequence of state transitions to reduce or avoid transition state toggling, thereby allowing each capacitor an opportunity to have its voltage steered as necessary, rather than allowing one capacitor to be voltage balanced before voltage balancing another capacitor.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 7A is a state transition diagram of one possible boundary zone transition pattern for the boundary zone between Zones 1 and 2 for the 5-level DC-to-DC converter circuit of FIG. 6.

FIG. 7B is a state transition diagram of one possible boundary zone transition pattern for the boundary zone between Zones 2 and 3 for the 5-level DC-to-DC converter circuit of FIG. 6.

FIG. 7C is a state transition diagram of one possible boundary zone transition pattern for the boundary zone between Zones 3 and 4 for the 5-level DC-to-DC converter circuit of FIG. 6.

Like reference numbers and designations in the various drawings indicate like elements.

DETAILED DESCRIPTION

The present invention encompasses multi-level DC-to-DC converter circuits and related methods that permit a full range of output voltages across all operational zones. Embodiments allow generation of output voltages very close to and at the boundaries of each zone. Some embodiments include circuits and methods that allow balancing of capacitor voltages and avoidance of voltage overstress of the converter circuit switch transistors.

Multi-Level DC-to-DC Converters

Figure 1:
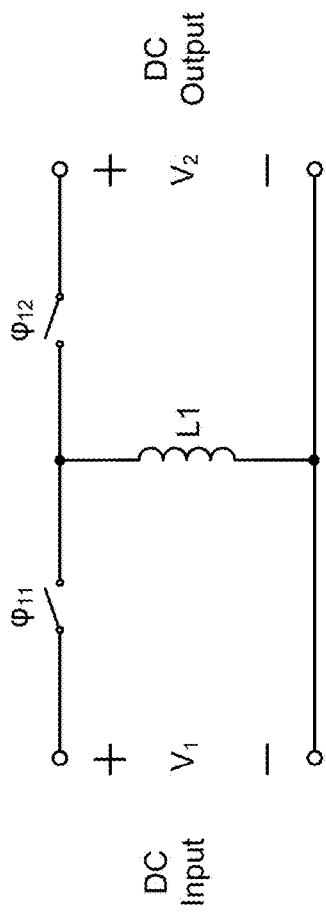
FIG. 1 is a schematic diagram of one type of inductor-based prior art two-level inverting buck-boost converter circuit.

An inductor-based multi-level DC-to-DC converter switches between at least three states, each of which defines one of at least three different voltages presented to an inductor (in contrast, the converter circuit of FIG. 1 only switches between two states). During normal operation for a particular input voltage and output voltage, a multi-level converter circuit switches back and forth between two states (e.g., between 0 V and $V_1/2$). However, as the input voltage and/or output voltage changes, it may be necessary to change to a different pair of states (e.g., $V_1/2$ and $V_1$). An inductor-based multi-level DC-to-DC converter may be configured as a buck only converter, as a boost only converter, or as a buck-boost converter, and may be inverting or non-inverting.

Figure 2A:
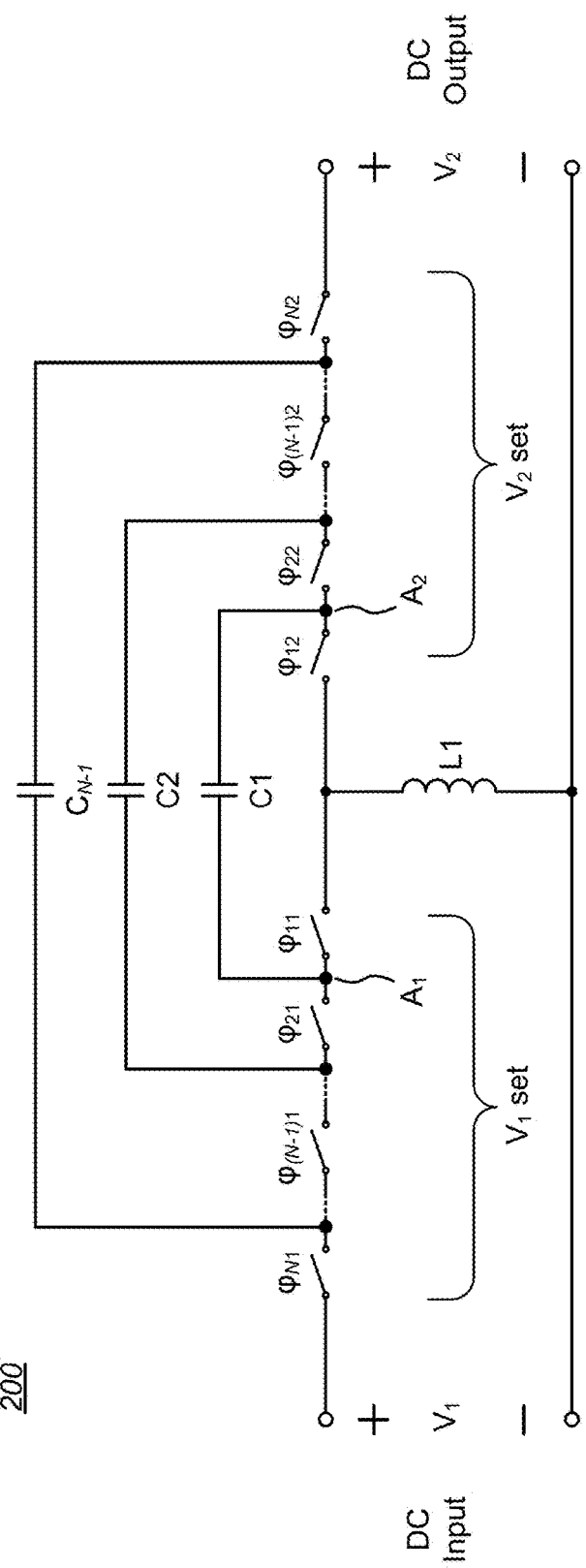
FIG. 2A is a schematic diagram of one type of inductor-based multi-level inverting buck-boost converter circuit that overcomes many of the limitations of the two-level converter of FIG. 1.

As one example, FIG. 2A is a schematic diagram of one type of inductor-based multi-level inverting buck-boost converter circuit 200 that overcomes many of the limitations of the two-level converter of FIG. 1. The multi-level converter 200 converts an input voltage $V_1$ to an output voltage $V_2$ by actively switching two or more series-connected switches (generally MOSFETs). The state transition patterns of the switches determine operational zones and corresponding $V_2$ ranges.

In the example of FIG. 2A, the multi-level converter circuit 200 includes a shunt inductor L1 bracketed by two sets ($V_1$ set, $V_2$ set) of series-connected switches designated by their respective clock signals (e.g., $\varphi_{x1}$ and $\varphi_{x2}$, where x=1 to N, and N is an integer ≥2). The series-connected switches comprise a switch path having a voltage input configured to be coupled to a voltage source, and a voltage output configured to be coupled to an electrical load. Each pair of switches in the first and second sets of series-coupled switches is separated by a respective node. The node between each pair of switches in one set (e.g., $\varphi_{x1}$ and $\varphi_{(x+1)1}$) is coupled by a capacitor Cx to the corresponding node between each pair of switches in the other set (e.g., $\varphi_{x2}$ and $\varphi_{(x+1)2}$). Thus, node A1 between switches $\varphi_{11}$ and $\varphi_{21}$ is coupled by capacitor C1 to node A2 between switches $\varphi_{12}$ and $\varphi_{22}$. Again, the clock signals $\varphi_{x1}$ and $\varphi_{x2}$ for each $V_1$, $V_2$ set of switches are complementary and are provided by a control circuit (not shown).

Figure 2B:
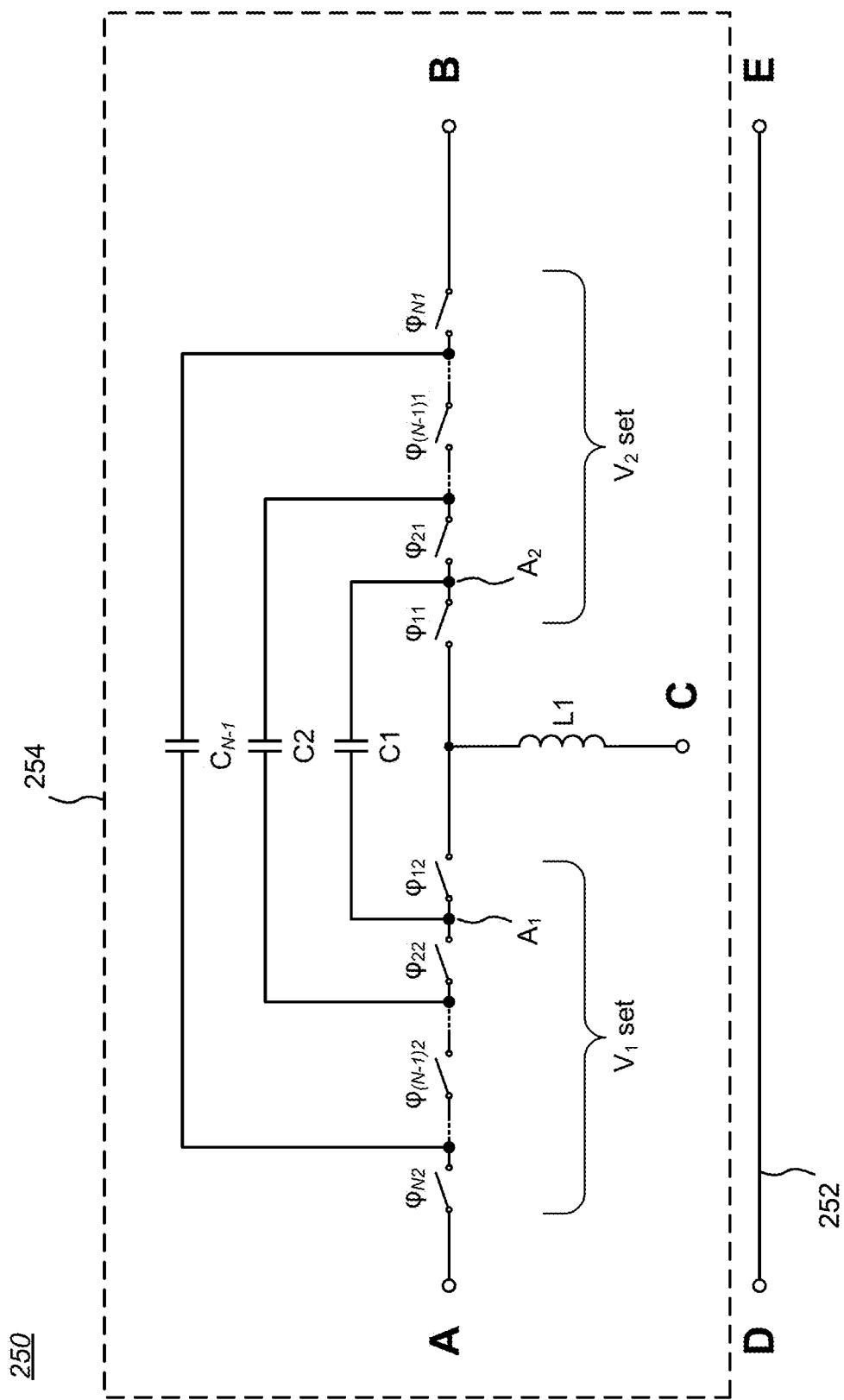
FIG. 2B is a schematic diagram of a generalized type of inductor-based multi-level converter circuit that may be configured as a buck-boost converter, or as a buck converter, or as a boost converter.

FIG. 2B is a schematic diagram of a generalized type of inductor-based multi-level converter circuit 250 that may be configured as a buck-boost converter, or as a buck converter, or as a boost converter. While similar in most respects to the multi-level converter circuit 200 of FIG. 2A, the inductor L1 may be regarded as having a distinct circuit node C that may be connected in a number of different configurations.

For example, connecting circuit node C to a circuit ground line 252 and using circuit nodes A and D for DC input and terminals B and E for DC output results in the multi-level inverting buck-boost converter circuit 200 of FIG. 2A. In another configuration, if circuit node B is connected to the circuit ground line 252 and an input voltage is applied at circuit nodes A and D, the output voltage at circuit nodes C and E will be a fraction of the input voltage, resulting in a buck converter configuration. In yet another configuration, if circuit node B is connected to the circuit ground line 252 and an input voltage is applied at circuit nodes C and E, the output voltage at circuit nodes A and D will be a multiple of the input voltage, resulting in a boost configuration. Thus, the circuitry within dashed box 254 may be considered to be a three-terminal core device having circuit nodes or terminals A, B, and C.

For any allowed value of N, the inductor L1 of the multi-level converters 200, 250 is exposed to more than two voltage levels and has more than two states. By increasing the number of levels, the voltage across the inductor L1 is reduced, thereby reducing the required inductance.

Figures 3A, 3B:
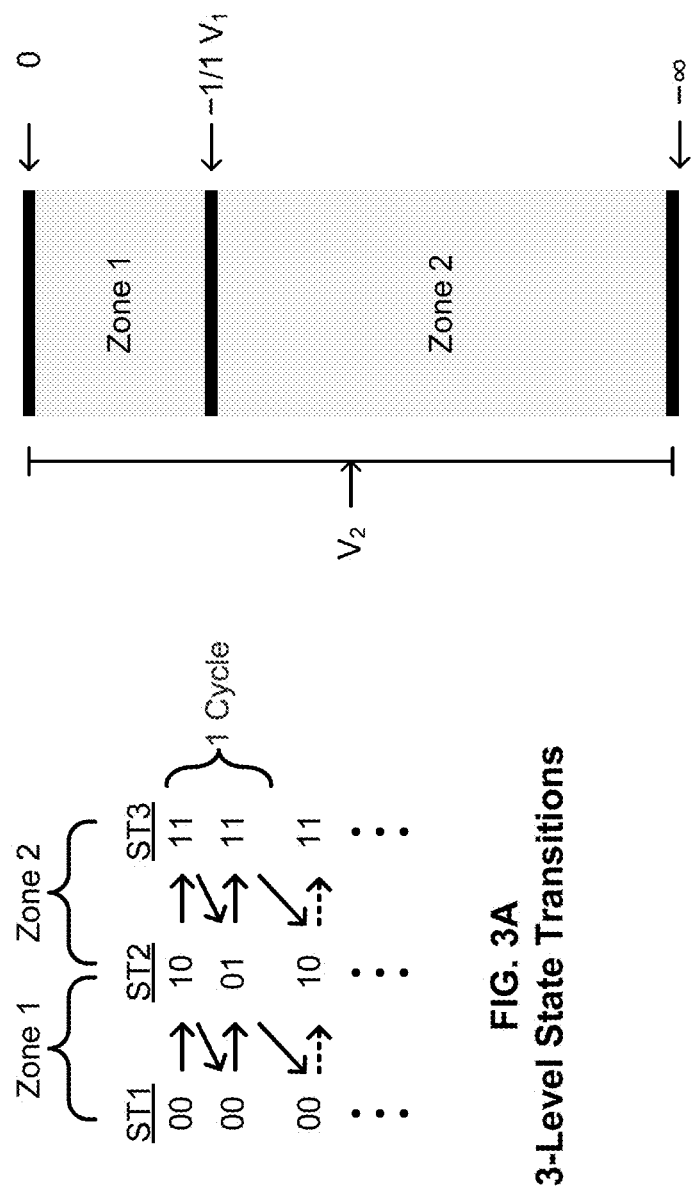
FIG. 3A is a state transition diagram showing the state transitions of the switches of a 3-level converter in two zones of operation.
FIG. 3B is a diagram showing zone output voltage $V_2$ ranges corresponding to FIG. 3A, relative to the input voltage $V_1$.

For example, if the converter circuit of FIG. 2A is configured so that N=2, the circuit will function as a 3-level converter that includes two sets of two switches (four switches total), one capacitor C1, and an inductor L1. The switches would be driven by a 2-phase clock pattern. For example, FIG. 3A is a state transition diagram showing the state transitions of the switches of a 3-level converter in two zones of operation, and FIG. 3B is a diagram showing zone output voltage $V_2$ ranges corresponding to FIG. 3A, relative to the input voltage $V_1$. Different patterns of switching determine which zone is operational and the switch state, and the output voltage $V_2$ is regulated by controlling the time the converter 200 stays in each state transition STx (similar to the variable duty cycle of a traditional 2-level converter). The duty cycle for a zone is the amount of time spent in a first state transition (e.g., ST1) versus a second state transition (e.g., ST2). For example, a duty cycle of 33%/67% for Zone 1 of a 3-level converter means that the bit sequences in ST1 are enabled for 33% of a cycle, and the bit sequences in ST2 are enabled for 67% of a cycle.

In the example of FIG. 3A, operation in Zone 1 allows the output voltage $V_2$ to range from about 0 to about $-1/1V_1$ (i.e., $-1V_1$, at an equivalent 2-level converter circuit duty cycle of 50%; see EQ. 1 above). Operation in Zone 2 allows the $V_2$ output voltage to range from about $-1V_1$ to something approaching negative infinity (at an equivalent 2-level converter circuit duty cycle of 100%). The binary values of each state transition STx represent the ON or OFF states of a corresponding switch in the $V_1$ set of switches of FIG. 2A ($\varphi_{21}$ and $\varphi_{11}$ in this example); the state of switches in the $V_2$ set of switches would be exactly complementary. In the following examples, the least significant bit of each state transition STx maps to switch $\varphi_{11}$, while the next more significant bit maps to switch $\varphi_{21}$. Each additional significant bit maps to a next switch in line, and thus the most significant bit N maps to switch $\varphi_{N1}$.

Thus, in FIG. 3A, when operating in Zone 1, switches $\varphi_{21}$ and $\varphi_{11}$ are both initially OFF (ST1=00 in the first row), and then transition to ON and OFF, respectively (ST2=10 in the first row). (Accordingly, the complementary switches $\varphi_{22}$ and $\varphi_{12}$ in the $V_2$ set are both initially ON, and then transition to OFF and ON, respectively). The next transition in Zone 1 sets switches $\varphi_{21}$ and $\varphi_{11}$ both OFF (ST1=00 in the second row), and then transition to OFF and ON, respectively (ST2=01 in the second row). The next transition is from ST2=01 in the second row to ST1=00 in the third row. That completes one cycle of switching for the 3-level converter circuit when operating in Zone 1, and the cycle repeats. When operating in Zone 2, switches $\varphi_{21}$ and $\varphi_{11}$ are initially ON and OFF respectively (ST2=10 in the first row), and then both transition to ON (ST3=11 in the first row). The next transition in Zone 2 sets switches $\varphi_{21}$ and $\varphi_{11}$ to OFF and ON, respectively (ST2=01 in the second row), and then both transition to ON (ST3=11 in the second row). The next transition is from ST3=11 in the second row to ST2=10 in the third row. That completes one cycle of switching for the 3-level converter circuit when operating in Zone 2, and the cycle repeats.

As FIG. 3B approximately indicates, operation in Zone 1 allows a range of inverse buck voltages (0 to about $-1V_1$), while operation in Zone 2 allows a range of inverse boost voltages (about $-1V_1$ to something approaching negative infinity), depending in both cases on a selected duty cycle for the state transitions STx. Compared to the inductor of a 2-level converter, the inductor L1 of a 3-level converter sees twice (2×) the fundamental frequency and no more than ½ the voltage. Accordingly, the lower voltage and higher frequency experienced by the inductor L1 allows use of a smaller inductor.

Figure 4B:
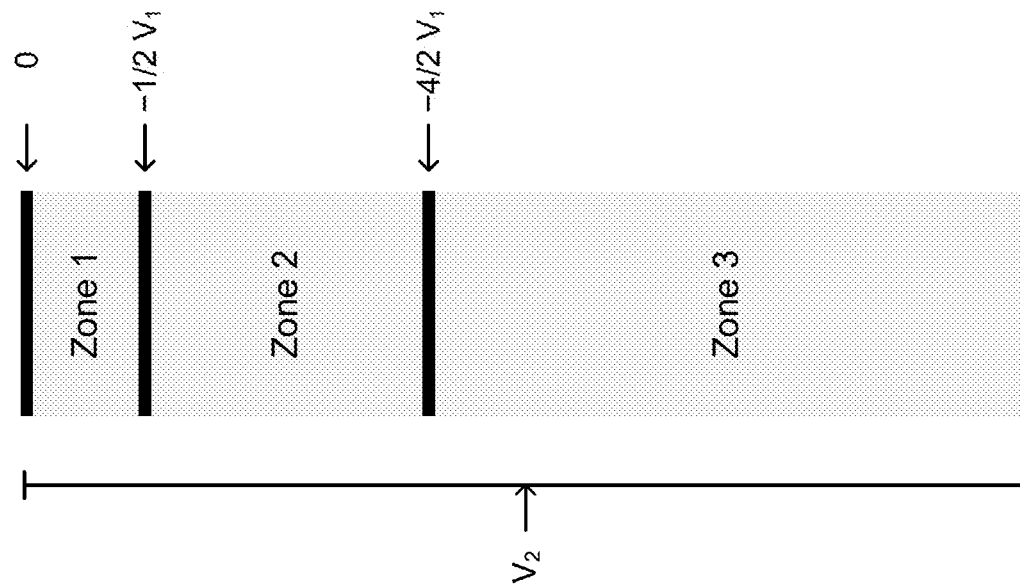
FIG. 4B is a diagram showing zone voltage ranges corresponding to FIG. 4A.
Figure 4A:
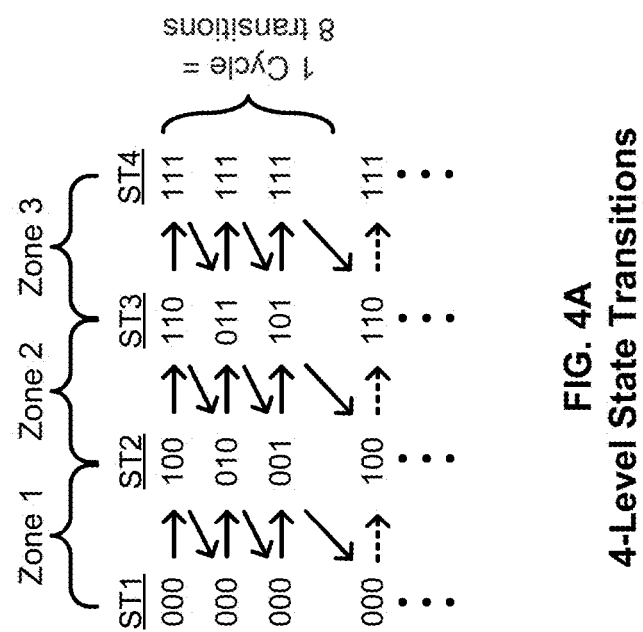
FIG. 4A is a state transition diagram showing the state transitions of the switches of a 4-level converter in three zones of operation.

As another example, if the converter circuit of FIG. 2A is configured so that N=3, the circuit will function as a 4-level converter that includes two sets of three switches (six switches total), two capacitors C1, C2, and an inductor L1. The switches would be driven by a 3-phase clock pattern. For example, FIG. 4A is a state transition diagram showing the state transitions of the switches of a 4-level converter in three zones of operation, and FIG. 4B is a diagram showing zone voltage ranges corresponding to FIG. 4A. Again, different patterns of switching determine which zone is operational. In the example of FIG. 4A, operation in Zone 1 allows the $V_2$ output voltage to range from about 0 to about $-\frac{1}{2}V_1$ (at an equivalent 2-level converter circuit duty cycle of about 33%). Operation in Zone 2 allows the $V_2$ output voltage to range from about $-\frac{1}{2}V_1$ to about $-4/2V_1$ (i.e., $-2V_1$, at an equivalent 2-level converter circuit duty cycle of about 67%). Operation in Zone 3 allows the $V_2$ output voltage to range from about $-2V_1$ to something approaching negative infinity (at an equivalent 2-level converter circuit duty cycle of 100%). The binary values of each state transition STx represent the ON or OFF statues of a corresponding switch in the $V_1$ set of switches ($\varphi_{31}$, $\varphi_{21}$, and $\varphi_{11}$ in this example); again, the state of switches in the $V_2$ set of switches would be exactly complementary. Compared to the inductor of a 2-level converter, the inductor L1 of a 4-level converter sees three times (3×) the fundamental frequency and experiences no more than ⅓ the voltage, thus allowing use of a significantly smaller inductor.

Figure 5B:
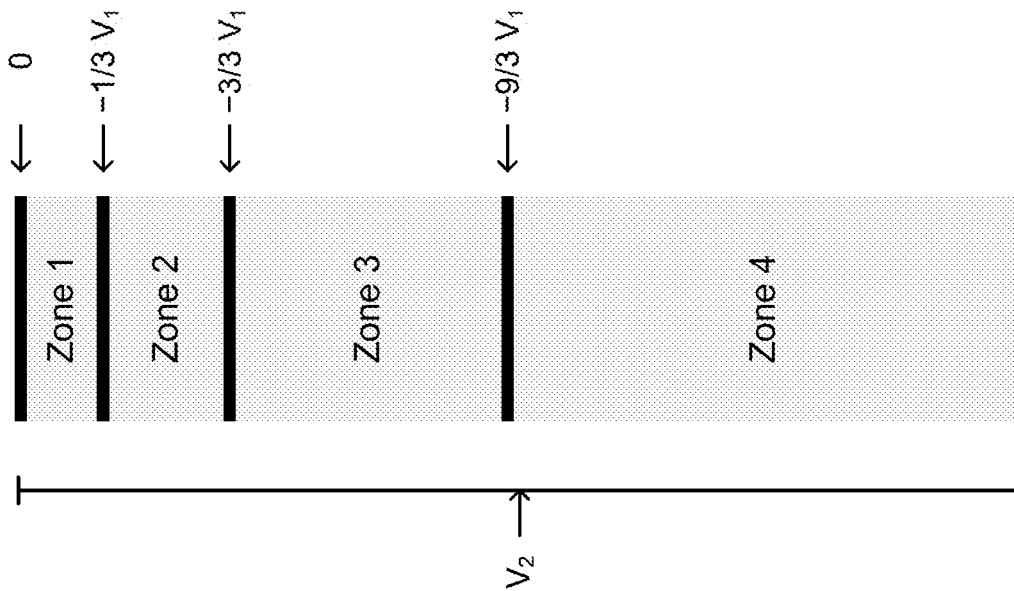
FIG. 5B is a diagram showing zone voltage ranges corresponding to FIG. 5A.
Figure 5A:
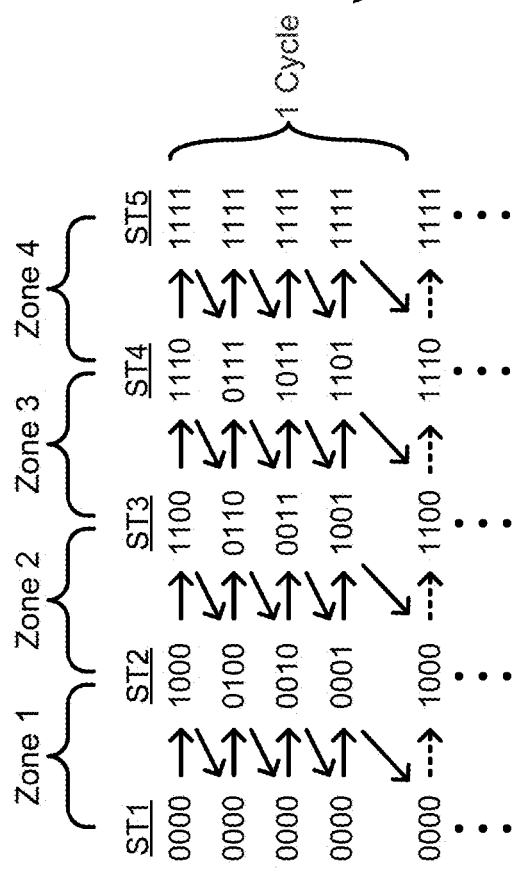
FIG. 5A is a state transition diagram showing the state transitions of the switches of a 5-level converter in four zones of operation.

As yet another example, if the converter circuit of FIG. 2A is configured so that N=4, the circuit will function as a 5-level converter that includes three sets of three switches (eight switches total), three capacitors C1, C2, C3, and an inductor L1. The switches would be driven by a 4-phase clock pattern. For example, FIG. 5A is a state transition diagram showing the state transitions of the switches of a 5-level converter in four zones of operation, and FIG. 5B is a diagram showing zone voltage ranges corresponding to FIG. 5A. Again, different patterns of switching determine which zone is operational. In the example of FIG. 5A, operation in Zone 1 allows the $V_2$ output voltage to range from about 0 to about $-\frac{1}{3}V_1$ (at an equivalent 2-level converter circuit duty cycle of 25%). Operation in Zone 2 allows the $V_2$ output voltage to range from about $-\frac{1}{3}V_1$ to about $-3/3V_1$ (i.e., $-1V_1$, at an equivalent 2-level converter circuit duty cycle of 50%). Operation in Zone 3 allows the $V_2$ output voltage to range from about $-1V_1$ to about $-9/3V_1$ (i.e., $-3V_1$, at an equivalent 2-level converter circuit duty cycle of 75%). Operation in Zone 4 allows the $V_2$ output voltage to range from about $-3V_1$ to something approaching negative infinity (at an equivalent 2-level converter circuit duty cycle of 100%). The binary values of each state transition STx represent the ON or OFF statues of a corresponding switch in the $V_1$ set of switches ($\varphi_{41}$, $\varphi_{31}$, $\varphi_{21}$, and $\varphi_{11}$ in this example); again, the state of switches in the $V_2$ set of switches would be exactly complementary.

Compared to the inductor of a 2-level converter, the inductor L1 of a 5-level converter sees four times (4×) the fundamental frequency and experiences no more than ¼ the voltage, thus allowing use of a significantly smaller inductor. For example, TABLE 1 compares the voltage across the inductor L1 for a traditional 2-level inverting buck-boost architecture versus a 5-level inverting buck-boost architecture for the same $V_1$ and $V_2$ voltage levels.

TABLE 1

| | | 2-Level Converter | | 5-Level Converter | |
|---|---|---|---|---|---|
| $V_1$ | $V_2$ | L1 voltage range | Delta | L1 voltage range | Delta |
| +5 V | −1 V | +5.0 V to −1.0 V | 6 V | +0.5 V to −1.0 V [Zone 1 with 33/67% DC] | 1.5 V |
| +5 V | −3 V | +5.0 V to −3.0 V | 8 V | +1.0 V to −1.0 V [Zone 2 with 50/50% DC] | 2 V |
| +3 V | −5 V | +3.0 V to −5.0 V | 8 V | +1.0 V to −1.0 V [Zone 3 with 50/50% DC] | 2 V |
| +3 V | −12 V | +3.0 V to −12.0 V | 15 V | +3.0 V to −0.75 V [Zone 4 with 80/20% DC] | 3.75 V |

Multi-Level DC-to-DC Converter Design Challenges

Despite their many advantages compared to 2-level converters, multi-level converters are more complex and difficult to control. One significant problem is that, while generating $V_2$ output voltages within each zone is relatively straightforward, generating $V_2$ very close to and at the boundaries of each zone is often not possible because the finite pulse width of the clock signals and the duty cycle cannot actually be 0% or 100%. For example, generating a $V_2$ output of exactly $-\frac{1}{3}V_1$ in a 5-level converter would require a 100% duty cycle for capacitor C2 states, which is not possible. More generally, the minimum duty cycle is determined by the minimum pulse width that a circuit can process. For example, if the minimum pulse width is 12 ns and the frequency that the inductor L1 sees is 5 MHz (200 ns period), then the minimum duty cycle would be 6%. In FIGS. 3B, 4B, and 5B, the broad black bands at the boundaries of each zone are "boundary zones" that represent unattainable output voltages for $V_2$ using conventional multi-level DC-to-DC converter circuits. For example, referring to FIG. 3B, Zone 1 and Zone 2 should theoretically abut at $-V_1$, but practical circuits cannot generate output voltages very close to (e.g., ±6-10%) or at the theoretical boundaries of each zone.

Another challenge is ensuring that the capacitor voltages are fully balanced so that all FET switches are subjected to a similar $V_{DS}$ voltage. However, there are non-idealities that can cause the capacitor voltages to go out of balance, such as mis-matched capacitances, capacitor equivalent series resistance (ESR), FET switch ON resistance ($R_{ON}$), and asymmetrical capacitor charging/discharging (for example, because of the different series combinations of switches and capacitors among states). Unbalanced capacitors can lead to breakdown of a FET switch due to exposure to excessively high voltages.

A related problem is that, at startup of a converter circuit, a too-high charging rate of the capacitors may result in voltage overstress of the switch transistors.

In order to generate output voltages very close to and at the boundaries of each zone, embodiments of the present invention essentially alternate (toggle) among adjacent (or even near-by) zones. Accordingly, a multi-level DC-to-DC converter circuit in accordance with this aspect of the invention would operate in a first zone for a selected time and then in a second zone for a selected time before transitioning back to the first zone. Thus, the two zones are treated as a single "super-zone".

Some embodiments of multi-level DC-to-DC converter circuits include a parallel "shadow" capacitor voltage balancing circuit that connects a capacitor Cx to a source voltage to charge that capacitor, or couples two or more capacitors Cx together to transfer charge from a higher voltage capacitor to a lower voltage capacitor, all under the control of real-time capacitor voltage measurements. Capacitor voltages are restored to target voltages in real time, thus preventing the FET switches from seeing excessive high voltages. In addition, the "shadow" capacitor voltage balancing circuit may be used to pre-charge the DC-to-DC converter capacitors at a relatively slow and even rate such that the capacitor voltages rise proportionally, thus preventing voltage overstress on the main switches of the DC-to-DC converter.

Some embodiments use a lossless voltage balancing solution where out-of-order state transitions of a multi-level DC-to-DC converter circuit are allowed to take place during normal operation. The net effect of out-of-order state transitions is to increase or decrease the voltage across specific capacitors, thus preventing voltage overstress on the main switches of the DC-to-DC converter. In some embodiments, restrictions are placed on the overall sequence of state transitions to reduce or avoid transition state toggling, thereby allowing each capacitor an opportunity to have its voltage steered as necessary, rather than allowing one capacitor to be voltage balanced before voltage balancing another capacitor.

5-Level DC-to-DC Converter Circuit Example

Figure 6:
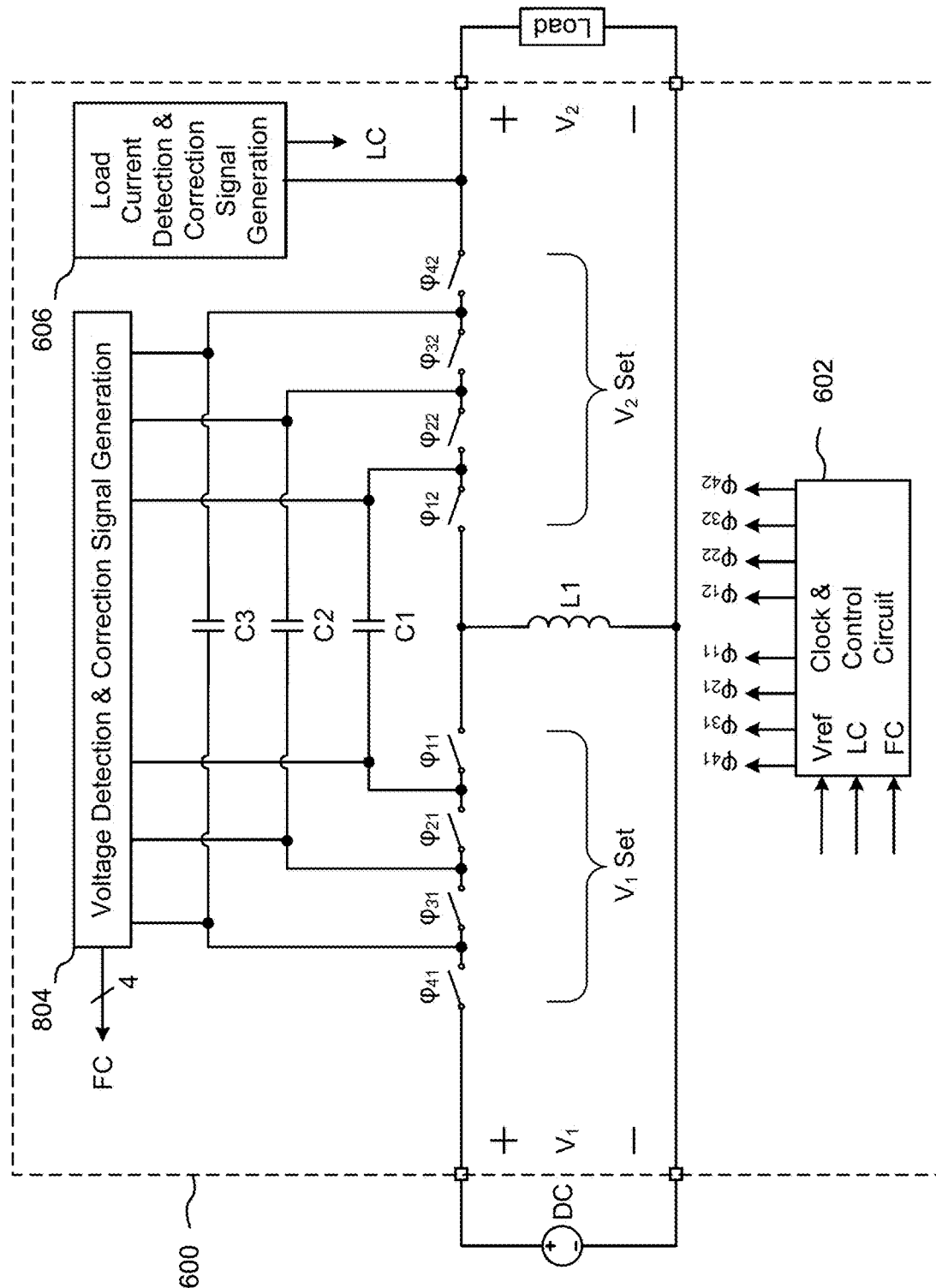
FIG. 6 is a schematic diagram of a 5-level DC-to-DC inverting buck-boost converter circuit.

For ease of understanding, the examples set forth in this description utilize a 5-level DC-to-DC converter circuit. For example, FIG. 6 is a schematic diagram of a 5-level DC-to-DC inverting buck-boost converter circuit 600. However, without loss of generality, the inventive aspects of the present invention may be applied to other multi-level DC-to-DC converter circuits, including non-inverting versions, buck-only versions, and boost-only versions.

In FIG. 6, a clock and control circuit 602 provides variable duty cycle clock pulses $\varphi_{x1}$ to a $V_1$ set of switches, and variable duty cycle clock pulses $\varphi_{x2}$ to a $V_2$ set of switches, where x=1 to 4 for this example. The clock pulses for the $V_2$ set of switches are complementary to corresponding clock pulses for the $V_1$ set of switches. The clock pulses are essentially pulse width modulated (PWM) switching voltages.

For normal operation, clock pulses are applied to the 5-level DC-to-DC converter circuit 600 in the zone patterns shown in FIG. 5A to generate output voltages $V_2$ in the zone ranges shown in FIG. 5B. Thus, to select a particular output voltage $V_2$, a determination is made as to which zone should be selected as the operational zone (thus determining the pattern of state transition bit sequences) and a corresponding duty cycle (thus determining the specific value of $V_2$ relative to $V_1$). For example, if $V_1$=3V, for a desired $V_2$ of −0.922V (thus, $V_2$ would be less than −⅓ of $V_1$), Zone 1 in FIG. 5A would be selected, and the duty cycle might be 6% of the cycle time in ST1 states, and 94% of the cycle time in ST2 states. A duty cycle of more than 6% of the cycle time in ST1 states, and less than 94% of the cycle time in ST2 states, will cause $V_2$ to have a value closer to zero. In some embodiments, the clock and control circuit 602 may include a map of $V_2$ (relative to $V_1$) as a function of zone and cycle time values, which may be determined for a particular circuit by modeling, calculation, and/or empirical calibration. The map may be implemented in a look-up table (LUT) or in combinatorial logic.

The switches $\varphi_{x1}$, $\varphi_{x2}$ in FIG. 6 may be, for example, field effect transistors (particularly MOSFETs), and may be implemented on an integrated circuit "chip". While a single switch symbol is shown for each switch $\varphi_{x1}$, $\varphi_{x2}$, one or more of the switches $\varphi_{x1}$, $\varphi_{x2}$ may comprise a series stack of transistors (particularly MOSFETs), for example, to handle higher voltages.

The three capacitors C1-C3 preferably have the same value, and typically would be off-chip with respect to the switches $\varphi_{x1}$, $\varphi_{x2}$. The inductor L1 would also typically be off-chip. As one example of values for a 1.25 MHz switching frequency, capacitors C1-C3 may be about 2 microfarads or higher, and inductor L1 may be about 110 nanohenries. For the illustrated configuration, the capacitor voltages $V_{Cx}$ would be as set forth in TABLE 2 under ideal proportionally balanced conditions.

TABLE 2

| Capacitor Voltages |
|---|
| $V_{C1} = ¼ (V_1 - V_2)$ |
| $V_{C2} = ½ (V_1 - V_2)$ |
| $V_{C3} = ¾ (V_1 - V_2)$ |

Boundary Zone Transitions

In order to generate output voltages within a boundary zone, embodiments of the present invention essentially alternate (toggle) among adjacent (or even nearby) zones by setting states of the converter circuit switches in a boundary zone transition pattern. For a 5-level DC-to-DC converter circuit there are three boundary zones, between Zones 1 and 2, between Zones 2 and 3, and between Zones 3 and 4; see, for example, FIG. 5B. Thus, in one example embodiment, to generate an output voltage $V_2$ near or at the theoretical boundary between Zone 2 and Zone 3 (i.e., near or at $-V_1$, in this example), the switches would toggle among state transitions ST2, ST3, and ST4 (see FIG. 7B, further described below). Accordingly, for this particular example, the 5-level DC-to-DC converter circuit 600 would operate in Zone 2 for a selected time and in adjacent Zone 3 for a selected time. Thus, Zones 2 and 3 are treated as a single "super-zone". More generally, in some cases, it may be useful to create super-zones using non-adjacent zones, or using more than two zones (adjacent and/or non-adjacent).

A number of different boundary zone transition patterns can be utilized to alternately switch between zones in accordance with the present invention. For example, FIGS. 7A-7C are state transition diagrams of possible boundary zone transition patterns for the boundary zones of the 5-level DC-to-DC converter circuit 600 of FIG. 6. The transition states within and between each zone preferably follow a reflected binary code (also known as a Gray code) bit sequence such that only one bit position is changed per transition, thereby reducing switching losses and the magnitude of voltage transients. While a specific reflected binary code is shown in FIGS. 7A-7C, other reflected binary code bit sequences may be used.

FIG. 7A is a state transition diagram of one possible boundary zone transition pattern for the boundary zone between Zones 1 and 2 for the 5-level DC-to-DC converter circuit 600 of FIG. 6. In the illustrated example, starting at ST1 0000, the 5-level converter circuit 600 first transitions to ST2 1000, a Zone 1 transition that is the same as a conventional 5-level converter. However, the second transition is from ST2 1000 to ST3 1100—that is, a transition over to Zone 2 (in contrast, in conventional converters, the second transition would have been from ST2 1000 to ST1 0000, all in Zone 1). A third transition is from ST3 1100 to ST2 0100 (in Zone 2), a fourth transition is from ST2 0100 to ST1 0000 (back over to Zone 1, indicated by a "top" left-arrow in the second row), a fifth transition is from ST1 0000 to ST2 0100 (in Zone 1, indicated by a "bottom" right-arrow in the second row), and a sixth transition is from ST2 0100 to ST3 0110 (back over to Zone 2). The remaining transitions within and between Zone 1 and Zone 2 of the Super-Zone 1-2 are similar. There are a total of 16 transitions that make up one repeating cycle in the Super-Zone 1-2 of FIG. 7A, whereas a conventional single zone pattern has 8 transitions (see FIG. 5A as one example). The bit sequences of the transition states in FIG. 7A are for controlling the $V_1$ set of switches in FIG. 6; the bit sequences for controlling the $V_2$ set of switches in FIG. 6 would be complementary. At power up for this mode of operation, a power-on reset initializes the circuit state to ST1 0000 in Zone 1.

FIG. 7B is a state transition diagram of one possible boundary zone transition pattern for the boundary zone between Zones 2 and 3 for the 5-level DC-to-DC converter circuit 600 of FIG. 6. The pattern of intra-zone and inter-zone state transitions is similar to FIG. 7A, although the bit sequence value for each state differs. Similarly, FIG. 7C is a state transition diagram of one possible boundary zone transition pattern for the boundary zone between Zones 3 and 4 for the 5-level DC-to-DC converter circuit 600 of FIG. 6. The pattern of intra-zone and inter-zone state transitions is similar to FIG. 7A (again, the bit sequence value for each state differs).

Thus, when in a boundary zone mode of operation, the clock and control circuit 602 controls the $V_1$ and $V_2$ set of switches of FIG. 6 with a 16-transition cycle of switch states. In contrast, when in a normal mode of operation (that is, not near or at a zone boundary), the clock and control circuit 602 controls the $V_1$ and $V_2$ set of switches with an 8-transition cycle of switch states.

The bit sequences represented by the binary values in FIG. 5A and FIGS. 7A-7C (and their complementary bit sequences) control which switches in FIG. 6 are set to ON or OFF. The clock and control circuit 602 generates the bit sequences and outputs suitable switch voltages to set a corresponding ON or OFF state for the switches $\varphi_{x1}$, $\varphi_{x2}$ in FIG. 6. A simple 3-bit control code can be used to select a mode of zone or boundary zone operation for the clock and control circuit 602; an example of such a zone select code is shown in TABLE 3. Alternatively, the clock and control circuit 602 may be coupled to direct control lines for each zone (i.e., not binary encoded); thus, for the current example, 7 control lines would be needed to select among the zones (including boundary zones). In either case, the value of the zone select code may be determined by the selection (statically or dynamically) of a particular output voltage $V_2$, which in turn may result from application of a digital code or an analog voltage or current to the clock and control circuit 602.

TABLE 3

| Control Line # | Zone Select Code | Active Zone/Boundary Zone |
| --- | --- | --- |
| 1 | 000 | Zone 1 |
| 2 | 001 | Boundary Zone 1-2 |
| 3 | 010 | Zone 2 |
| 4 | 011 | Boundary Zone 2-3 |
| 5 | 100 | Zone 3 |
| 6 | 101 | Boundary Zone 3-4 |
| 7 | 110 | Zone 4 |

The clock and control circuit 602 may include a map of $V_2$ (relative to $V_1$) as a function of conventional zones, boundary zones, and cycle time values. The map values may be determined for a particular circuit by modeling, calculation, and/or empirical calibration. The map may be implemented in a look-up table (LUT) or in combinatorial logic. A more detailed example of a clock and control circuit is described below with respect to FIG. 11.

Boundary Zone Transitions Using Sub-Zones

While FIGS. 7A-7C show which switches in FIG. 6 are set to ON or OFF to achieve an output voltage $V_2$ that is near or at a theoretical inter-zone boundary, enhancements can be made to smooth zone-to-zone transitions. In particular, the complexity of switching the capacitors C1-C3 and the inductor L1 among states may require some dynamic control of the duty cycles (pulse widths) for each selected mode of zone operation to better match $V_2$ at zone transition boundaries. Thus, it is often useful to design the clock and control circuit 602 to generate duty cycles that provide a smooth $V_2$ voltage ramp near and at zone boundaries.

In some embodiments where the polarity of an error amplifier is reversed periodically to allow for increased error amplifier effective output voltage range, it has been found useful to subdivide boundary zones into two parts, with one part being on the lower voltage side of a theoretical zone boundary, and the other party being on the higher voltage side of a theoretical zone boundary. In such embodiments, at the junction of the two parts or sub-zones, the error amplifier polarity reverses. For example, the boundary zone between Zone 1 and Zone 2 may be divided so as to include Zone 1-2_low and Zone 1-2_high sub-zones; similar subdivisions may be made for the boundary zone between Zone 2 and Zone 3 and for the boundary zone between Zone 3 and Zone 4. In addition to error amplifier polarity reversals in such embodiments, the clock synchronization changes between a fixed pulse width and a modulated pulse width between the low and high boundary sub-zones, as further described below.

Taking Super-Zone 1-2 as an example, with $V_1$=3V, TABLE 4A shows possible duty cycles for operation in Zone 1 near the low side of the boundary between Zone 1 and Zone 2, transitioning towards Zone 2. With the selected values of 6% of the cycle time in ST1 states and 94% of the cycle time in ST2 states, $V_2$=−0.922V. If the particular clock and control circuit 602 cannot generate duty cycles of less than 6%, then boundary zone transitions can be used to obtain values for $V_2$ nearer to, and at, the theoretical boundary between Zone 1 and Zone 2. For example, using the 16-state transition cycle shown in FIG. 7A, Zone 1-2_low sub-zone duty cycles of 17% for ST1 and 83% for ST2 generates $V_2$=−0.785V, and 6% for ST3 and 94% for ST2 generates $V_2$=−1.082V, for an average $V_2$ of −0.934V (keeping in mind that other circuitry, such as an output storage capacitor, may be used to further smooth out $V_2$). Of note, the duty cycle of the ST1-ST2 state transitions actually increases in the Zone 1-2_low sub-zone to generate a lower $V_2$ voltage to offset the higher $V_2$ voltage of the ST2-ST3 state transitions.

TABLE 4A

| $V_1$ = 3 V | | | | | | | | | |
| --- | --- | --- | --- | --- | --- | --- | --- | --- | --- |
| Zone 1 | | | Zone 1-2_low | | | | | | |
| "error amp" pathway | | | "error amp" pathway | | | "fixed bias" pathway | | | |
| ST1 | ST2 | $V_2$ | ST1 | ST2 | $V_2$ | ST3 | ST2 | $V_2$ | $V_2$ avg |
| 6% | 94% | −0.922 | 17% | 83% | −0.785 | 6% | 94% | −1.082 | −0.934 |

Similarly, TABLE 4B shows possible duty cycles for operation in the Zone 1-2_high sub-zone, again transitioning towards Zone 2. Duty cycles of 6% for ST1 and 94% for ST2 generates $V_2=-0.922$, and 17% for ST3 and 83% for ST2 generates $V_2=-1.24V$, for an average $V_2$ of $-1.081V$. Obtaining higher values for $V_2$ eventually requires operation in Zone 2 near the high side of the theoretical boundary between Zone 1 and Zone 2. With the selected values of 94% of the cycle time in ST2 states and 6% of the cycle time in ST3 states, $V_2=-1.082V$. Of note, the transition between Zone 1-2_low and Zone 1-2_high can be thought of (and implemented) as a polarity reversal of the duty cycles (17/83/94/6% in Zone 1-2_low versus 6/94/83/17% in Zone 1-2_high).

TABLE 4B

| $V_1 = 3\ V$ | | | | | | | | | |
|---|---|---|---|---|---|---|---|---|---|
| Zone 1-2_high | | | | | | | Zone 2 | | |
| "fixed bias" pathway | | | "error amp" pathway | | | | | | |
| ST1 | ST2 | $V_2$ | ST3 | ST2 | $V_2$ | $V_2$ avg | ST2 | ST3 | $V_2$ |
| 6% | 94% | −0.922 | 17% | 83% | −1.24 | −1.081 | 94% | 6% | −1.082 |

The example duty cycles in TABLES 4A and 4B show that $V_2$ smoothly ramps from low to high. Similar tables can be generated for sub-zones Zone 2-3_low and Zone 2-3_high, and sub-zones Zone 3-4 low and Zone 3-4 high. As should be clear, other duty cycle values (as well as other values of $V_1$) will result in other values of $V_2$. However, the goal is to select duty cycles that closely match (a) $V_2$ within a zone but near a boundary zone with (b) the average $V_2$ for the two zones that the boundary zone toggles between.

Figure 7D:
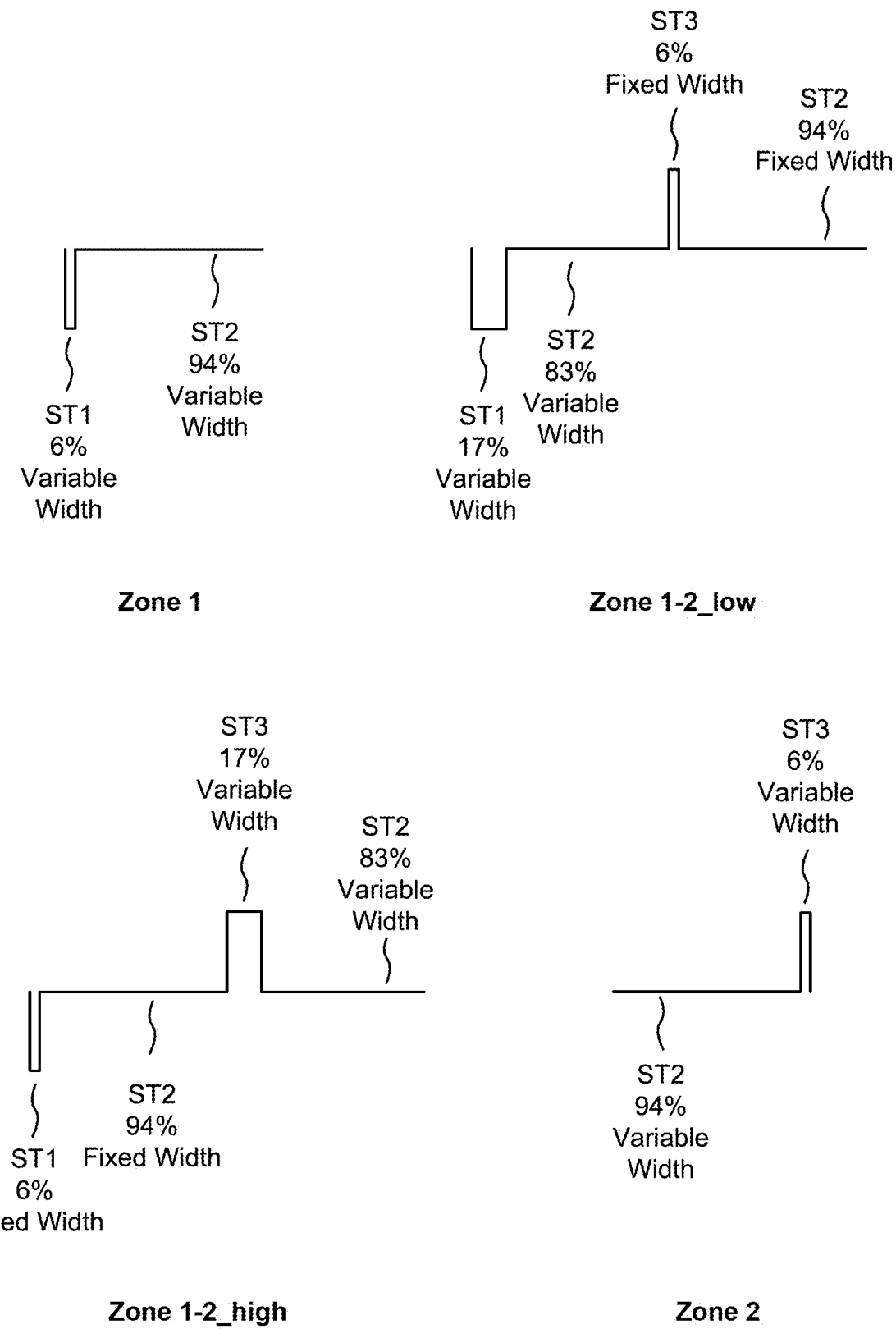
FIG. 7D is a set of timing diagrams showing the duty cycles described in TABLES 4A and 4B for the state transitions shown in FIG. 7A corresponding to Zone 1, sub-zones Zone 1-2_low and Zone 1-2_high, and Zone 2.

FIG. 7D is a set of diagrams showing the duty cycles described in TABLES 4A and 4B for the state transitions shown in FIG. 7A corresponding to Zone 1, sub-zones Zone 1-2_low and Zone 1-2_high, and Zone 2. The duty cycle diagram for Zone 1 corresponds to the Zone 1 variable width "error amp" pathway values in TABLE 4A. The diagram for Zone 1-2_low is a combination of two duty cycles: the Zone 1-2_low variable width "error amp" pathway values and the Zone 1-2_low fixed width "fixed bias" pathway values in TABLE 4A. The diagram for Zone 1-2_high is a combination of two duty cycles: the Zone 1-2_high fixed width "fixed bias" pathway values and the variable width "error amp" pathway values in TABLE 4B. The duty cycle diagram for Zone 2 corresponds to the Zone 2 variable width "error amp" pathway values in TABLE 4B.

Figure 7E:
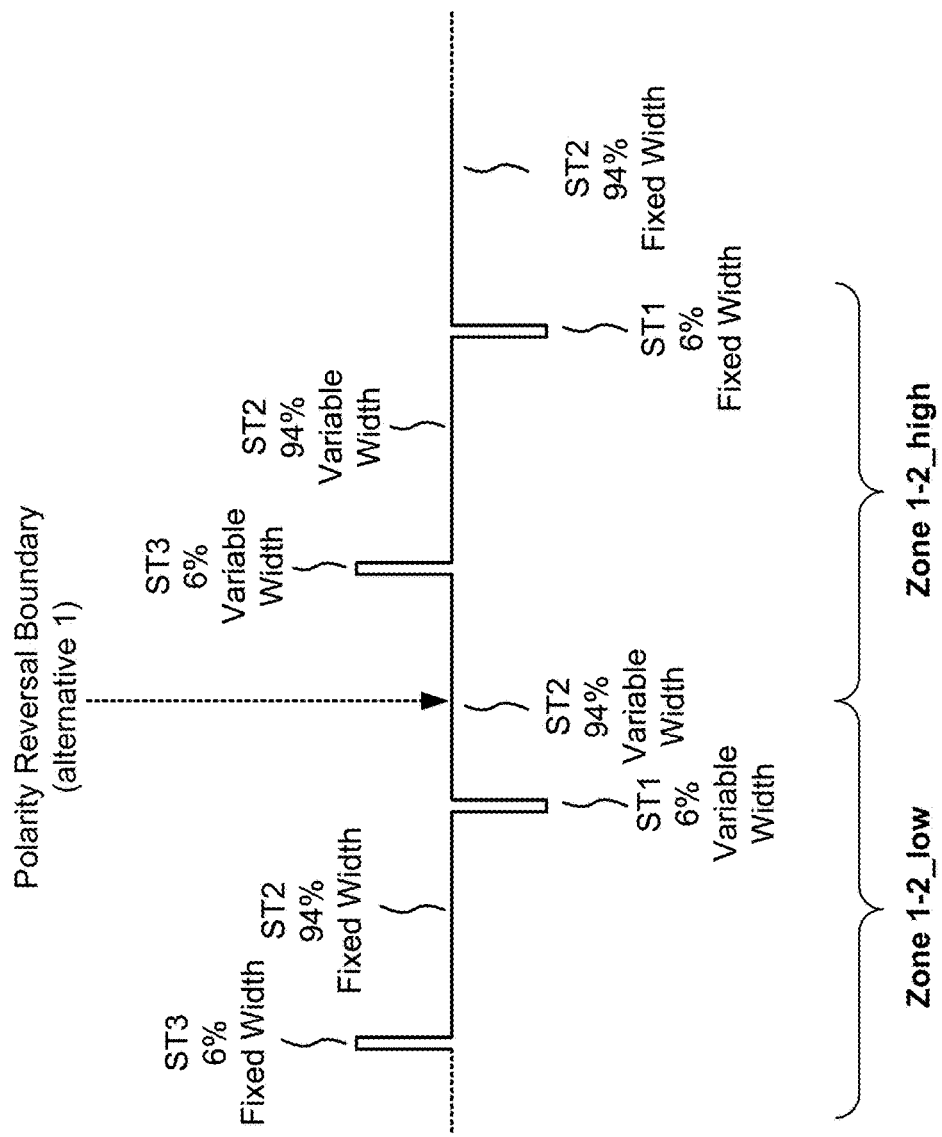
FIG. 7E is a diagram showing the blend of duty cycles around the polarity reversal boundary of a first embodiment.

In the illustrated embodiment, for output settings very close to the transition from Zone 1-2_low to Zone 1-_high (a "polarity reversal boundary"), the duty cycle can be considered to be a blend of the Zone 1-2_low combined duty cycle and the Zone 1-2_high combined duty cycle. For example, FIG. 7E is a diagram showing the blend of duty cycles around the polarity reversal boundary of a first embodiment. Note that some pulse widths are fixed and some pulse widths are variable, and that the percentages for the variable width pulses are end point values. The variable pulse widths for ST1 and ST3 in this example may range between 6% and 17%. The variable pulse widths increase as they move further away from the polarity reversal boundary toward Zone 1 (on the left) or Zone 2 (on the right), and typically it takes many cycles for a variable width pulse to change from 17% to 6%, or from 6% to 17%, around a polarity reversal boundary. When the control loop for the circuit shown in FIG. 11 below settles to the correct output voltage for current conditions (selected setting and load), the variable pulse widths would stop changing. Whenever the output voltage is commanded to change or there is a load step transient (meaning that the output load current changes), the variable pulse widths would change again.

Figure 7F:
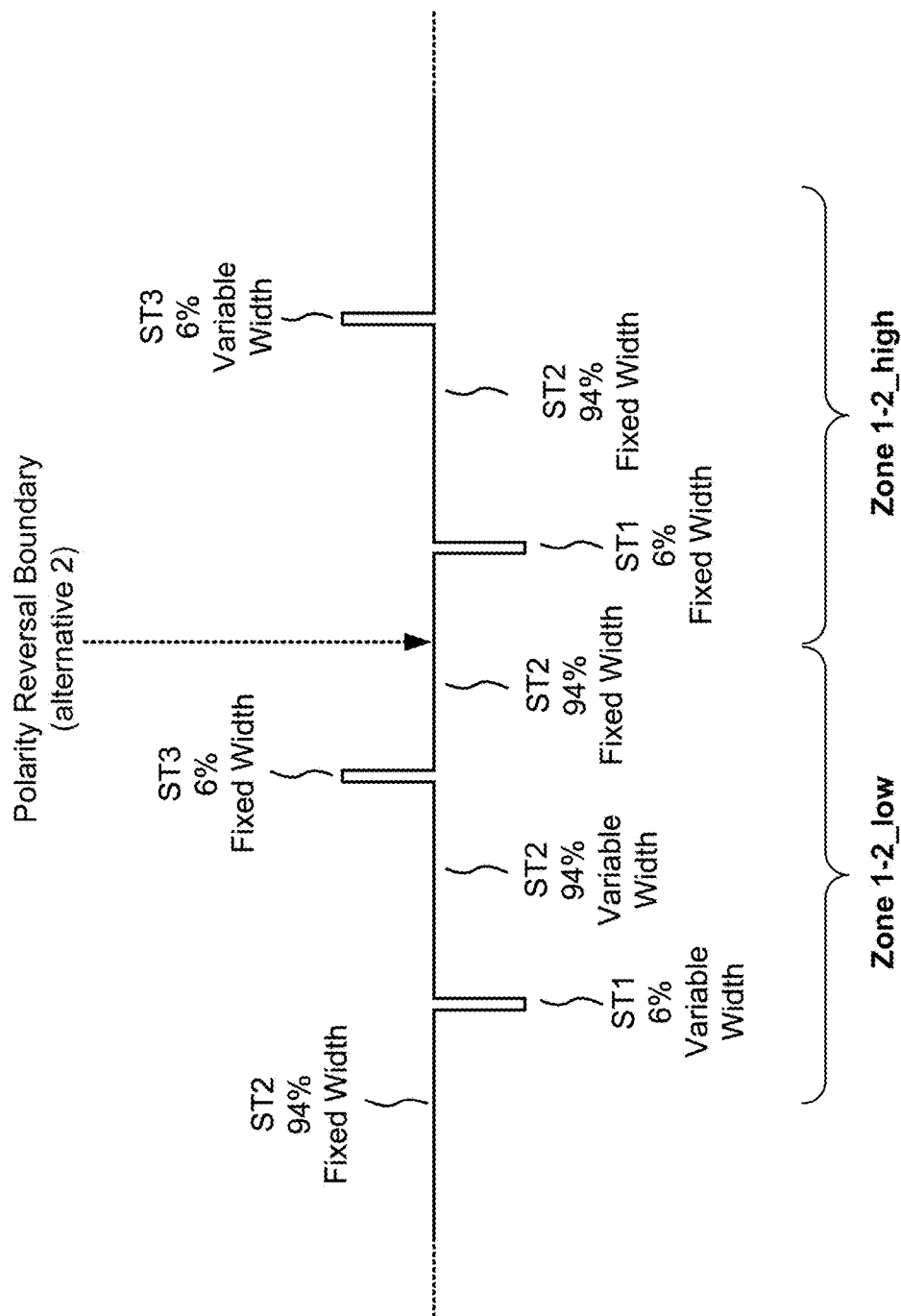
FIG. 7F is a diagram showing the blend of duty cycles around the polarity reversal boundary of a second embodiment.

FIG. 7F is a diagram showing the blend of duty cycles around the polarity reversal boundary of a second embodiment. The description above for FIG. 7E applies to FIG. 7F, the only difference being the location of the polarity reversal boundary between fixed-width ST3 and ST1 pulses, whereas in FIG. 7E, the polarity reversal boundary is between variable-width ST1 and ST3 pulses. The blended duty cycle patterns of FIGS. 7E and 7F are alternatives; in practice, normally only one blended duty cycle pattern would be used.

A simple 4-bit control code can be used to select a mode of zone operation—zone transitions or boundary sub-zone transitions (low or high)—for the clock and control circuit 602; an example of such a zone select code is shown in TABLE 5. Alternatively, the clock and control circuit 602 may be coupled to direct control lines for each zone (i.e., not binary encoded); thus, for the current example, 10 control lines would be needed to select among the zones and the boundary sub-zones. In either case, the value of the zone select code is determined by the selection (statically or dynamically) of a particular output voltage $V_2$, which in turn may result from application of a digital code or an analog voltage or current to the clock and control circuit 602.

TABLE 5

| Control Line # | Zone Select Code | Active Zone/Boundary Sub-Zone |
|---|---|---|
| 1 | 0000 | Zone 1 |
| 2 | 0001 | Zone 1-2_low (boundary sub-zone) |
| 3 | 0010 | Zone 1-2_high (boundary sub-zone) |
| 4 | 0011 | Zone 2 |
| 5 | 0100 | Zone 2-3_low (boundary sub-zone) |
| 6 | 0101 | Zone 2-3_high (boundary sub-zone) |
| 7 | 0110 | Zone 3 |
| 8 | 0111 | Zone 3-4_low (boundary sub-zone) |
| 9 | 1000 | Zone 3-4_high (boundary sub-zone) |
| 10 | 1001 | Zone 4 |

A particular clock and control circuit for selecting active zones, including boundary sub-zones, is described in detail below with respect to FIG. 11.

Capacitor Voltage Balancing—First Embodiment

As noted above, one challenge of multi-level DC-to-DC converter circuits is ensuring that the capacitor voltages are essentially fully proportionally balanced so that all FET switches are subjected to a similar drain-to-source voltage $V_{DS}$, since unbalanced capacitors can lead to breakdown of a FET switch due to exposure to high voltages. For the 5-level DC-to-DC converter circuit 600 of FIG. 6, fully proportionally balanced capacitor target voltages would be as shown in TABLE 2 above; at such target voltages, all switches would see a $V_{DS}$ drop of $\frac{1}{4}(V_1-V_2)$. Note also that even in a 3-level having a single capacitor C1, the capacitor voltage needs to be managed (balanced) so that the coupled FET switches are subjected to a similar drain-to-source voltage $V_{DS}$. However, because of the non-idealities noted above that can cause the capacitor voltages to go out of balance, capacitor voltages need to be restored to the target voltages in real time to prevent the FET switches from seeing excessive high voltages.

One solution to balancing capacitor voltages in a multi-level DC-to-DC converter circuit is to provide a parallel "shadow" circuit that conditionally couples a capacitor Cx to a source voltage to charge that capacitor, or conditionally couples two or more capacitors Cx together to transfer charge from a higher voltage capacitor to a lower voltage capacitor, or conditionally couples a capacitor Cx to a voltage sink to discharge that capacitor, all under the control of real-time capacitor voltage measurements. For many practical embodiments, it is preferable to keep the capacitor voltages to within generally about 250 mV, but no more than about 500 mV, of the target voltages. However, note that these two numbers are arbitrarily chosen for a particular embodiment. More generally, a small voltage tolerance is better but should be large enough to be unaffected by transient noise present at the circuit level.

Figure 8:
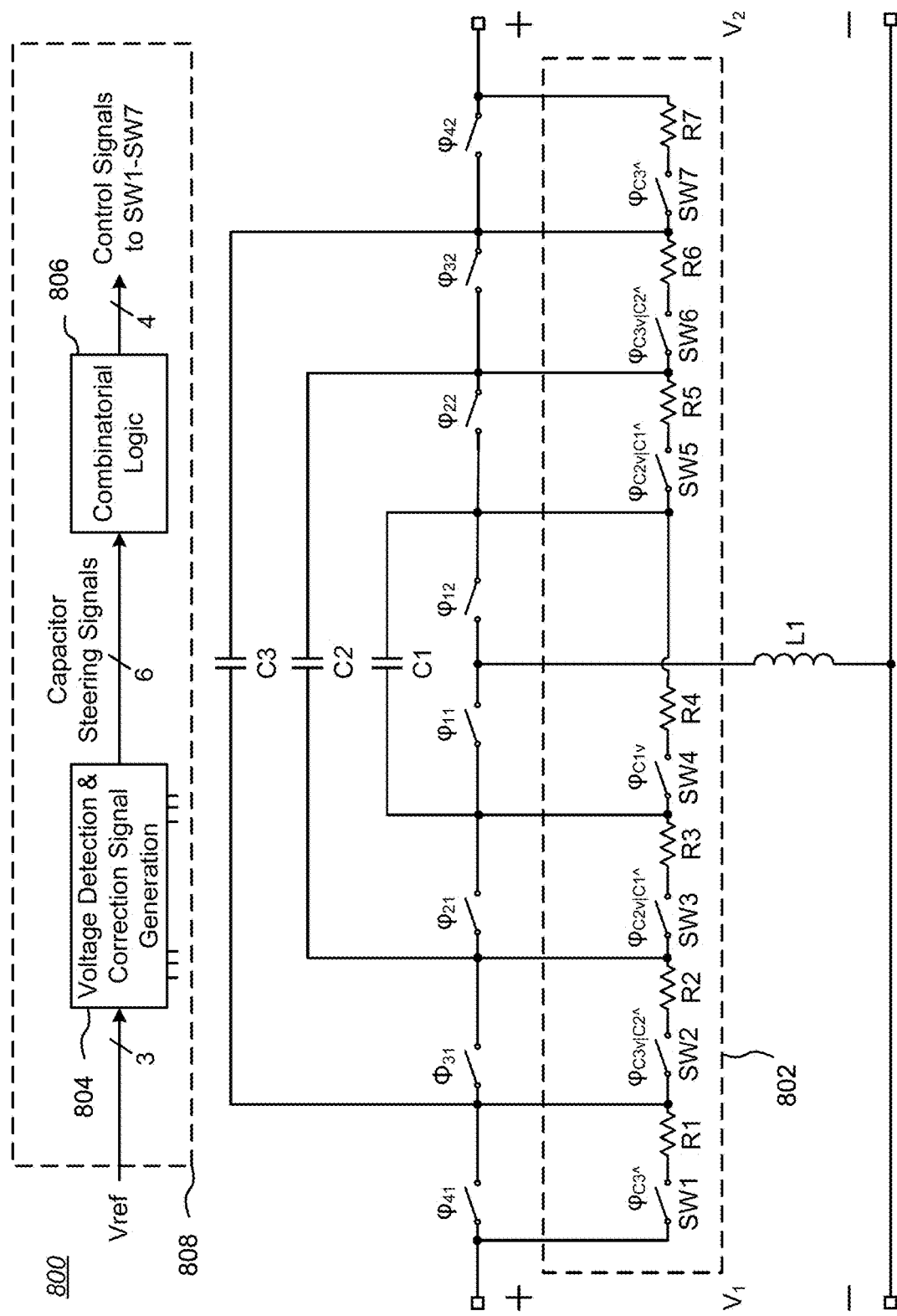
FIG. 8 is a schematic diagram of a first embodiment of a multi-level DC-to-DC converter circuit that includes a capacitor voltage balancing circuit in accordance with the present invention.

For example, FIG. 8 is a schematic diagram of a first embodiment of a multi-level DC-to-DC converter circuit 800 that includes a capacitor voltage balancing circuit in accordance with the present invention. The control circuitry shown in FIG. 6 and the connections of the voltage detection and correction signal generation circuit 804 to the capacitors Cx are omitted for clarity. One aspect of the illustrated capacitor voltage balancing circuit is a switched resistance network 802 comprising series-connected paired switches SWx and resistances Rx that are also coupled in parallel with the main switches $\varphi_{x1}$, $\varphi_{x2}$ and capacitors Cx of a DC-to-DC converter circuit (in this example, a 5-level circuit). Each paired switch SWx and resistance Rx is coupled in parallel with at least one main switch $\varphi_{x1}$, $\varphi_{x2}$. In the illustrated embodiment, the innermost pair of main switches $\varphi_{11}$, $\varphi_{12}$ are both spanned by a single parallel paired switch SWx and resistance Rx (SW4 and R4, in this example).

The switches SWx in FIG. 8 may be, for example, field effect transistors (particularly MOSFETs), and may be implemented on an integrated circuit "chip". While a single switch symbol is shown for each switch SWx, one or more of the switches SWx may comprise a series stack of transistors (particularly MOSFETs), for example, to handle higher voltages.

In one example embodiment, the resistances Rx have the values shown in TABLE 6 (as a point of reference, with these examples resistances, the main switches $\varphi_{x1}$, $\varphi_{x2}$ have an ON resistance, $R_{ON}$, of around 10 milli-ohms, which is about 2500 to 5000 times less than the resistance of the switch-resistor pairs SWx-Rx of the capacitor voltage balancing circuit). In another example embodiment, each switch and resistor pair is set to about 50 ohms of resistance. Note that these resistor values are chosen for a particular embodiment. High or lower resistor values may be used relative to the capacitor values (e.g., C1, C2, C3) and the speed at which the capacitor voltages can be controlled.

TABLE 6

| Resistor | Example Value (ohms) |
|---|---|
| R1 | 25 |
| R2 | 50 |
| R3 | 50 |
| R4 | 25 |
| R5 | 50 |
| R6 | 50 |
| R7 | 25 |

In the specific example illustrated in FIG. 8, the outermost switches SW1, SW7 are controlled to connect capacitor C3 to the input DC voltage source V1 and output V2 for charging; the innermost switch SW4 is controlled to short capacitor C1 through resistor R4 for discharging; and the intervening switches SW2, SW3, SW5, SW6 are controlled to connect corresponding capacitors together to transfer charge. Charge will always transfer from a higher voltage capacitor to a lower voltage capacitor, thereby decreasing the voltage of the higher voltage capacitor and increasing the voltage of the lower voltage capacitor.

A voltage detection and correction signal generation circuit 804 (also shown in FIG. 6) coupled to the capacitors Cx constantly senses deviations in the capacitor voltages with respect to a corresponding reference value and generates corresponding directional correction signals having an "UP" (e.g., $Cx^{\wedge}$) or "DOWN" (e.g., $Cx_{\vee}$) value. The voltage detection and correction signal generation circuit 804 may be implemented, for example, using an error amplifier or similar comparator to compare a reference voltage to the instantaneous voltage across a corresponding capacitor. However, one of ordinary skill in the art may utilize any of a number of known analog and/or digital voltage measurement circuits for generating such correction signals. In any case, it may be useful to use hysteretic error amplifiers or comparators, where the hysteresis voltage is the control tolerance. As is known in the art, hysteresis sets an upper and lower threshold to eliminate multiple transitions at too high of a frequency. Hysteresis is often used to eliminate output "chattering" in the presence of noise on slow moving signals at the input of a buffer or comparator. In this example, the amount of hysteresis may be chosen to be the same as the capacitor voltage control tolerance.

In the illustrated example, six capacitor steering signals are generated ($C3^{\wedge}/C3_{\vee}$, $C2^{\wedge}/C2_{\vee}$, and $C1^{\wedge}/C1_{\vee}$), which are coupled to a combinatorial circuit 806 that combines some of the steering signals and generates four control signals: $\varphi_{C3}^{\wedge}$, $\varphi C_{3_{\vee}|C2}^{\wedge}$, $\varphi_{C2_{\vee}|C1}^{\wedge}$, and $\varphi_{C1_{\vee}}$, where $\varphi_{C3_{\vee}|C2}^{\wedge}$ is the logic OR of the $C3_{\vee}$ & $C2^{\wedge}$ correction signals, and $\varphi_{C2_{\vee}|C1}^{\wedge}$ is the logic OR of the $C2_{\vee}$ & $C1^{\wedge}$ correction signals. The four control signals are coupled to the series-connected switches SWx (where x=7 in this example) of the switched resistance network 802; the same control signal may be coupled to more than one switch. Note that the combinatorial circuit 806 is shown as a separate component only for clarity in explaining the different functionality provided by the combinatorial circuit 806 and the voltage detection and correction signal generation circuit 804; however, the functions of both circuits may be combined into a single directional correction circuit 808.

The capacitor voltage balancing circuit works in parallel with normal operation of the main switches $\varphi_{x1}$, $\varphi_{x2}$, but the timing of the control signals generated by the capacitor voltage balancing circuit is independent of clock signal timing for the main switches $\varphi_{x1}$, $\varphi_{x2}$. Also, while the clocking for the main switches $\varphi_{x1}$, $\varphi_{x2}$ is complementary (out of phase), the control signals for the capacitor balance switches SWx on both sides of the inductor L1 are in phase.

It the illustrated 5-level multi-level DC-to-DC converter circuit 800, each generated control signal causes the corresponding switch or switches to turn ON, allowing a corresponding capacitor to begin to charge or begin to discharge, either by direct connection to a voltage source or sink, or by allowing charge to be shared between corresponding capacitors. Thus, for example, when switches SW1 and SW7 are turned ON by the $\varphi_{C3}{}^{\wedge}$ control signal, capacitor C3 is coupled to $V_1$ and $V_2$ and begins to charge. When the voltage across capacitor C3 matches a corresponding reference voltage applied to the voltage detection and correction signal generation circuit 804, the $\varphi_{C3}{}^{\wedge}$ control signal will not be generated, and switches SW1 and SW7 will revert to an OFF state. As another example, when switch SW4 is turned ON by the civ control signal, capacitor C1 is shorted through R4 and begins to discharge. When the voltage across capacitor C1 matches a corresponding reference voltage applied to the detection and correction signal generation circuit 804, the civ control signal will not be generated, and switch SW4 will revert to an OFF state. As yet another example, if switches SW2 and SW6 are turned ON by the $\varphi_{C3\vee C2}{}^{\wedge}$ combination control signal, capacitors C2 and C3 are connected together and excess charge is transferred from the higher voltage capacitor to the lower voltage capacitor until the control signal reverts to an OFF state.

Thus, the voltage $V_{Cx}$ across the capacitors Cx can be "steered" up (to a higher voltage) or down (to a lower voltage) by one or more control signals from the directional correction circuit 808 towards a balanced state with respect to each other. TABLE 7 sets forth the control signals and corresponding steering effect for the example 5-level multi-level DC-to-DC converter circuit 800 of FIG. 8.

TABLE 7

| Control Signal | Steering Effect |
| --- | --- |
| $\varphi_{C3}{}^{\wedge}$ | steers $V_{C3}$ up |
| $\varphi_{C3\vee C2}{}^{\wedge}$ | steers $V_{C3}$ down and $V_{C2}$ up |
| $\varphi_{C2\vee C1}{}^{\wedge}$ | steers $V_{C2}$ down and $V_{C1}$ up |
| $\varphi_{C1\vee}$ | steers $V_{C1}$ down |

As should be clear, while the example of FIG. 8 shows a 5-level multi-level DC-to-DC converter circuit 800, the example circuitry for balancing the voltages across the capacitors Cx can be extended to other multi-level DC-to-DC converter circuits, including buck, boost, or buck-boost converter circuits (any of which may be inverting or non-inverting). The switch-based capacitor voltage balancing method and circuitry may be used with multi-level DC-to-DC converter circuits of any level, and may be used in conjunction with conventional multi-level DC-to-DC converter circuits as well as multi-level DC-to-DC converter circuits using boundary zone transitions (e.g., such as the state transition patterns shown in FIGS. 7A-7C).

One advantage of the capacitor voltage balancing circuitry of the type shown in FIG. 8 is that the current through the switched resistance network 802 is independent of load current. A further advantage is that, for the specific example 5-level multi-level DC-to-DC converter circuit 800 with the resistance values set forth in TABLE 6, the capacitor voltage balancing circuitry keeps the capacitor voltages to within generally about 500 mV of the target voltages of TABLE 2.

Capacitor Pre-Charging

Another advantage of capacitor voltage balancing circuitry of the type shown in FIG. 8 is that the circuitry may be used for capacitor pre-charge during start-up of a multi-level DC-to-DC converter circuit. As part of the start-up sequence of a multi-level DC-to-DC converter circuit, capacitors should be charged to corresponding target voltage levels (see, for example, the voltages in TABLE 2) before normal switching can start. When the capacitors Cx are large (for example, more than about 20 g), an appreciable amount of time may be required to pre-charge. If the input voltage $V_1$ is high (e.g., >3.6V when using single MOSFETs for the main switches $\varphi_{x1}$, $\varphi_{x2}$), the input voltage ramp needs to be slow enough so that the capacitor voltages can rise proportionally in order to prevent voltage overstress on the main switches $\varphi_{x1}$, $\varphi_{x2}$.

Advantageously, the capacitors Cx in a multi-level DC-to-DC converter circuit can be initialized during start-up by allowing a capacitor voltage balancing circuit of the type shown in FIG. 8 to be active during initial $V_1$ ramp up while the main switches $\varphi_{x1}$, $\varphi_{x2}$ are kept in an initial state (i.e., the $V_1$ set of main switches are all OFF, the $V_2$ set of main switches are all ON). During this time, the capacitor voltages will gradually settle to the specified target voltages. The length of time will depend on the capacitance of the capacitors Cx—generally, it may take up to 3 ms for the capacitors to reach target voltage levels.

Figure 9:
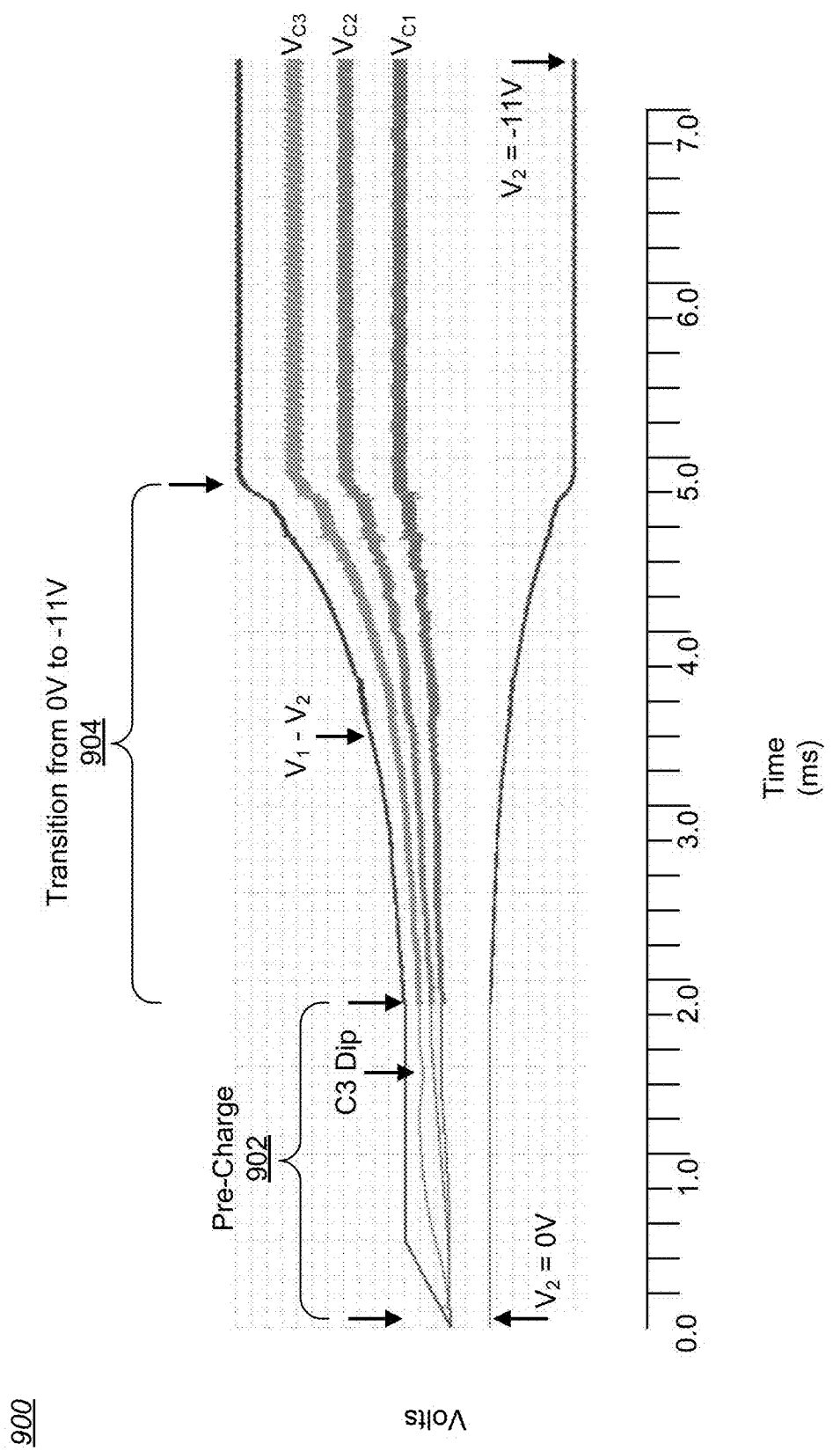
FIG. 9 is a timing diagram illustrating capacitor voltage (in relative volts) as a function of time (in milliseconds) for a 5-level multi-level DC-to-DC converter circuit.

As an example of pre-charging via a capacitor voltage balancing circuit, FIG. 9 is a timing diagram 900 illustrating capacitor voltage (in relative volts) as a function of time (in milliseconds) for a 5-level multi-level DC-to-DC converter circuit. In this example, the multi-level DC-to-DC converter circuit is set to output a target voltage of $V_2$=−11V. During a pre-charge period 902 in which the $V_1$ set of main switches are all OFF and the $V_2$ set of main switches are all ON, the voltage detection and correction signal generation circuit 804 will detect that the voltage across capacitor C3 is low and thus generate a steering control signal $\varphi_{C3}{}^{\wedge}$. That steering signal will turn switches SW1 and SW7 ON, thus connecting capacitor C3 to $V_1$ and $V_2$ (3V in this example). Note that $V_2$ is connected to circuit ground through the inductor L1, which behaves as a short at DC. Accordingly, capacitor C3 begins to charge through switches SW1 and SW7. Concurrently, the voltage detection and correction signal generation circuit 804 will detect that the voltage across capacitors C2 and C1 and generate corresponding steering control signals for switches SW2-SW6, causing transfer of some of the charge on capacitor C3 over to capacitor C2 via switches SW2 and SW6, and some of the charge on capacitor C2 over to capacitor C1 via switches SW3 and SW5. In the illustrated graph, the voltage across capacitor C3 dips at one point as charge is transferred to capacitors C2 and C1, but the voltage across capacitor C3 is restored by further action of the capacitor voltage balancing circuitry. At close to 2 ms in this example, normal switching of the main switches $\varphi_{x1}$, $\varphi_{x2}$ commences and the output $V_2$ transitions from 0V to the target voltage of −11V during a transition period 904.

Since the capacitors C1-C3 are pre-charged by action of the capacitor voltage balancing circuitry at a relatively slow and even voltage rate, as shown by FIG. 9, the capacitor voltages rise proportionally and thus prevent voltage overstress on the main switches $\varphi_{x1}$, $\varphi_{x2}$.

Capacitor Voltage Balancing—Second Embodiment

Capacitor voltage balancing circuitry of the type shown in FIG. 8 works well in general, but such circuitry is considered "lossy" because the balance current through the switched resistance network 802 will dissipate as heat, thus degrading efficiency. An alternative voltage balancing solution is to use a lossless approach where out-of-order state transitions of a multi-level DC-to-DC converter circuit are allowed to take place during normal operation. The net effect of out-of-order state transitions is to increase or decrease the voltage across specific capacitors.

Figure 10:
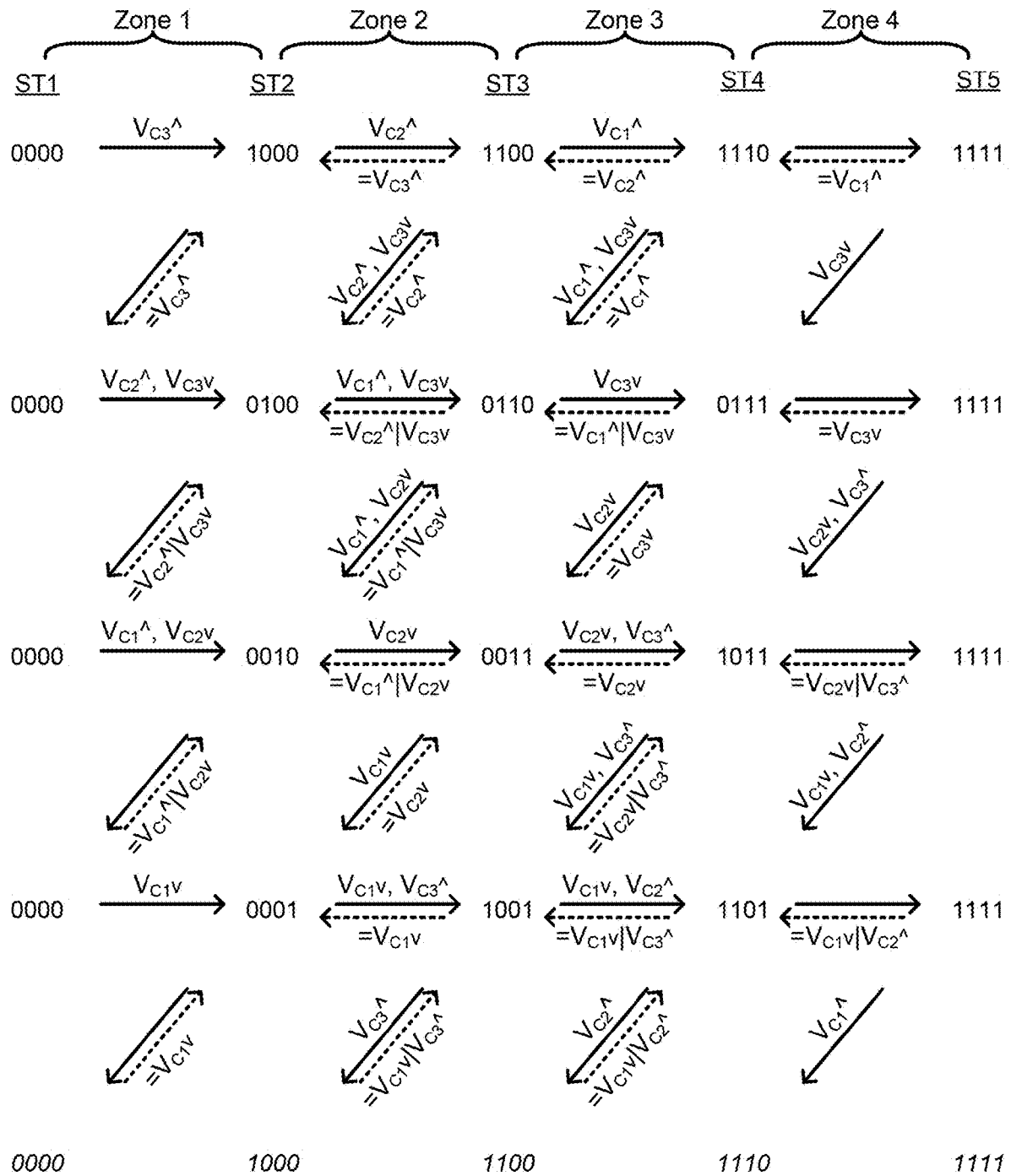
FIG. 10 is a state transition diagram of one possible lossless capacitor voltage balancing transition pattern for the 5-level DC-to-DC converter circuit of FIG. 6.

For example, FIG. 10 is a state transition diagram of one possible lossless capacitor voltage balancing state transition pattern for the 5-level DC-to-DC converter circuit 600 of FIG. 6. Solid arrows indicate a normal, forward-order of state transitions when capacitor voltages are balanced; solid arrows with annotations indicate the direction (up or down) of voltage change across a corresponding capacitor that occurs due to the transition. Thus, for example, "$V_{C3}{}^{\wedge}$" for the forward transition from ST1 0000 to ST2 1000 means that the voltage across capacitor C3 is increased by the transition. Similarly, "$V_{C2}{}^{\wedge}, V_{C3\vee}$" for the forward transition from ST3 1100 to ST2 0100 means that the voltage across capacitor C2 is increased by the transition while the voltage across capacitor C3 is decreased by the transition. Absence of an annotation on a solid arrow means that the voltage across the capacitors is essentially unchanged by the forward transition. One cycle of state transitions is shown (but note that the bottom row of italicized numbers represents the beginning of the next cycle).

When capacitor voltages become unbalanced, one aspect of the invention allows backward, out-of-order state transitions in order to steer capacitor voltages towards a balanced state. In FIG. 10, out-of-order state transitions are indicated by dotted arrows. In one example embodiment, the voltage detection and correction signal generation circuit 804 of FIG. 8 may be used to constantly sense the capacitor voltages of the 5-level DC-to-DC converter circuit 600 of FIG. 6, and generate voltage correction signals having an "UP" (e.g., $V_{Cx}{}^{\wedge}$) or "DOWN" (e.g., $V_{Cx\vee}$) value with respect to a corresponding reference value. The generated voltage correction signals are then used to force the state transition pattern for a cycle to undergo suitable out-of-order transitions to states that help balance capacitor voltages. In FIG. 10, each dotted arrow has an annotation which indicates the corresponding voltage correction signals $V_{Cx}{}^{\wedge}$, $V_{Cx\vee}$ which, alone or in a logical OR combination, force an out-of-order state transition to try to balance the voltage across a corresponding capacitor.

For example, in Zone 2, ST2 0100 would normally transition to ST3 0110 (keeping in mind the benefits of using a Gray code). However, if the voltage detection and correction signal generation circuit 804 determines that the voltage across capacitor C2 is out of balance on the low side—and thus needs to be steered to a higher voltage—then the resulting correction signal, $V_{C2}{}^{\wedge}$, will force a transition from ST2 0100 back to ST3 1100.

As another example, in Zone 2 state ST2 0010, if the generated voltage correction signals indicate that the voltage across capacitors C1 and C3 should both be steered higher (i.e., the voltage correction signals are $V_{C1}{}^{\wedge}$ and $V_{C3}{}^{\wedge}$), an out-of-order state transition would take place from ST2 0010 to ST3 0110 because the $V_{C1}{}^{\wedge}$ control signal makes the out-of-order decision condition true: "$V_{C1}{}^{\wedge}$ OR $V_{C3\vee}$" (thus, the $V_{C3}{}^{\wedge}$ control signal is ignored). The next state transition would go forward, from ST3 0110 to ST2 0010. If the voltage correction signal $V_{C1}{}^{\wedge}$ persists, another out-of-order state transition would take place backwards from ST2 0010 to ST3 0110 (unless sequential out-of-order state transitions are blocked, as discussed below).

Note that, optionally, "chained" out-of-order state transitions may be allowed. For example, ST2 0010 is forced back to ST3 0110 if $V_{C3\vee}$ exists, but there is also an out-of-order state transition pathway from ST3 0110 to ST2 0100 if $V_{C3\vee}$ exists. Such chained out-of-order state transitions may be allowed or disallowed depending on a desired rate of capacitor voltage balancing. For example, in cases where the load current is high, there may be a need to disallow back-to-back (chained) out-of-order state transitions to slow down the voltage balancing rate.

The generated voltage correction signals from the voltage detection and correction signal generation circuit 804 of FIG. 8 may be applied to combinatorial circuitry or a look-up table to alter the normal generation of forward transition states. For example, the logic of FIG. 10 may be generalized to allow a transition from a current state to a forward state to proceed UNLESS a specific generated voltage correction signal or signals (i.e., the signals following the equal signs in FIG. 10) is received, in which case, the transition direction is changed from the current state to a backward state.

As should be appreciated, the pattern of out-of-order state transitions shown in FIG. 10 may differ for different embodiments, and the invention is not limited to the particular pattern shown in FIG. 10. However, in general, the pattern of out-of-order state transitions is constrained if a reflected binary code (e.g., Gray code) for state bit sequences is specified as a design requirement in order to reduce switching losses and the magnitude of voltage transients. For the example shown in FIG. 10, for Zone 2 and Zone 3 transitions, there are no other out-of-order state transitions possible since, for a particular state, there are only two options for a Gray code transition. However, for Zone 1 and Zone 4, there are four options for any ST1/ST2 transition and any ST4/ST5 transition.

An advantage of allowing out-of-order state transitions is that the current across the inductor L1 is used to balance the capacitor voltages so there is no degradation of efficiency—that is, the process is essentially lossless.

The lossless capacitor voltage balancing method and circuitry may be used with multi-level DC-to-DC converter circuits of any level, including buck, boost, or buck-boost converter circuits (any of which may be inverting or non-inverting), and may be used in conjunction with conventional multi-level DC-to-DC converter circuits as well as multi-level DC-to-DC converter circuits using boundary zone transitions (e.g., such as the state transition patterns shown in FIGS. 7A-7C). In addition, the lossless capacitor voltage balancing method and circuitry can be used in conjunction with lossy capacitor voltage balancing method and circuitry such as the type shown in FIG. 8. For example, if one or more capacitors are far out of balance, which may occur if the output current load is high, then it may be useful to connect the switched resistance network 802 of FIG. 8 into circuit for asynchronous capacitor voltage balancing. However, at lower load levels, it may be useful to disconnect the switched resistance network 802 and instead utilize lossless out-of-order state transitions. Another methodology is to include both circuit configurations (i.e., the switched resistance network 802 and the logic for lossless out-of-order state transitions) and setting the capacitor voltage tolerance for lossless voltage balancing at a lower value (e.g., 250 mV) while setting the capacitor voltage tolerance for lossy voltage balancing at a higher value (e.g., 500 mV). By doing so, if lossless out-of-order state transition capacitor voltage balancing cannot keep the voltage limit to within the higher value, the lossy switched resistance network voltage balancing circuit would complement the lossless balance technique and work at the same time.

Flow Control of Out-of-Order Transitions

In a normal switching flow for a 5-level DC-to-DC converter circuit, there are 8 state transitions in each of Zones 1 to 4 per cycle. For a 5-level DC-to-DC converter circuit configured to use boundary zones, there are 16 state transitions in boundary zones 1-2, 2-3, and 3-4 per cycle. When capacitor voltages are being steered by the lossless capacitor voltage balancing method, out-of-order state transitions are introduced, as described above, thus enabling more state transitions per cycle. The number of out-of-order state transitions allowed per full 8-transition or 16-transition cycle will determine how fast capacitor voltages can move towards respective target values.

It may happen that the voltage across multiple capacitors can become out of balance at the same time. In a simplistic capacitor voltage balancing scheme, one capacitor may be balanced before trying to balance another capacitor. For instance, in the example above, the state transitions could toggle back and forth between ST2 0010 and ST3 0110 while trying to balance the voltage $V_{C1}$ across capacitor C1. That means the $V_{C3}^{\wedge}$ control signal also present—but ignored—will continue to be ignored during the toggling sequence. Unregulated state transitions would allow toggling back and forth between ST2 0010 and ST3 0110, and the $V_{C1}$ voltage would be steered towards its target voltage at a maximum rate. However, the voltage $V_{C3}$ across capacitor C3 is not being balanced and will fall lower and lower, because the decision states for utilizing the $V_{C3}^{\wedge}$ control signal are not at the ST2 0010 and ST3 0110 states, but rather are at the ST2 1000 and ST3 1100 states. Thus, this scenario could have the potential of $V_{C3}$ going way out of balance while $V_{C1}$ is being brought back to balance. An even worse case is if the capacitance of C1 is larger than C3, leading to more transition state toggling cycles to balance $V_{C1}$, with $V_{C3}$ thus going out of balance faster.

A solution to the problem of transition state toggling is to place restrictions on the number of out-of-order state transition sequences, a sequence being an out-of-order backward state transition followed by a forward state transition (i.e., toggling between two transition states). Such a limitation would allow each capacitor an opportunity to have its voltage steered as necessary rather than allowing one capacitor to be voltage balanced before voltage balancing another capacitor. For instance, if only one out-of-order state transition sequence is allowed per full Zone 1 cycle, the $V_{C3}$ voltage in the above example would be steered towards its target voltage at a lower rate, since many of the state transitions would not steer the $V_{C3}$ voltage all (e.g., ST2 1000 to ST1 0000), and some state transitions may even steer the $V_{C3}$ voltage lower (e.g., ST1 0000 to ST2 0100). Note that, in a full cycle of normal forward transitions, all capacitors will see an equal number of up and down transitions, so having just one out-of-order state transition per full normal transition cycle would not have any significant negative effect on capacitor voltage (i.e., only making minor changes to the capacitor voltages).

Thus, an improved capacitor balance scheme does not try to first balance any single capacitor voltage before moving on to voltage balancing another capacitor; rather, all capacitors get a somewhat concurrent opportunity to be voltage balanced so that overall voltage deviation from the corresponding capacitor voltage target is reduced. Further, an upper limit (e.g., 1-4) may be placed on the number of allowed consecutive out-of-order state transition sequences for the same capacitor. Limiting the number of allowed consecutive out-of-order state transition sequences would also enable the state transitions to go through all states in a cycle so that each capacitor has an opportunity to be balanced by the appropriate out-of-order transitions pertaining to that specific capacitor. Such an improved scheme may be implemented, for example, by having an out-of-order state transition sequence counter that allows only N an out-of-order state transition sequences before causing forward transitions to resume, whereupon the counter is reset. In some embodiments, N may be the same for all out-of-order state transition sequences (e.g., a count of 1 or 2). In other embodiments, N may be based on the current state, such that some states allow for more out-of-order transition sequences than other states. In some embodiments, N may be allowed to vary as a function of how much capacitor voltage is out of balance. For example, there may be two levels of capacitor voltage tolerance detection. If capacitor voltage is out of balance by, for example, 250 mV, a lower number of N can be used. If the capacitor voltage is out of balance by, for example, 500 mV, a larger number of N can be used.

It may be noted that while the current across the inductor L1 is beneficially used to balance the capacitor voltages, the inductor current is dependent upon the load current, so the speed at which capacitor voltages can be balanced varies with the load current. If the load current is high, the balance current is also high, so the capacitor voltages can move faster and reach their respective target voltages faster. However, when the load current is small, there is very little current available to move the capacitor voltages. For example, a situation may occur in which load current steps abruptly from high to low, which causes the voltages across the capacitors to go out of balance—but the resulting low load current results in a longer time to balance the capacitor voltages.

Accordingly, one aspect of embodiments of the present invention is a method of adaptively regulating and varying the number of out-of-order transition sequences per cycle and/or consecutive out-of-order state transition sequences as a function of the load current in order to optimize the rate of lossless capacitor voltage balancing. For example, if an out-of-order state transition sequence counter is utilized as described above, N may be varied as a function of load current. For instance, N may be set to 4 or 5 for low load currents to permit more out-of-order transition sequences, and 1 or 2 for low load currents to permit fewer out-of-order transition sequences.

More generally, for the case of high load current, embodiments of the invention may introduce a minimal number of out-of-order state transition sequences per cycle, such as two, one, or even none (i.e., skipping any out-of-order state transition sequences in a particular cycle, effectively enabling only a fractional number of out-of-order state transition sequences per cycle). As a result, the speed at which a capacitor voltage can move is controlled by the frequency of any out-of-order state transition sequences per cycle. Limiting the number of out-of-order state transition sequences per cycle may be beneficial since otherwise, if too many out-of-order state transition sequences are allowed in a cycle, capacitor voltage can move too fast. When capacitor voltage moves faster than the capacitor balance control loop delay, oscillations can result.

For the case of low load current, more out-of-order state transition sequences may be allowed per cycle to move the capacitor voltages faster; otherwise, the capacitor voltages may move too slowly, and the capacitors may spend too much time in an undesirable over-voltage condition.

FIG. 6 includes one way of regulating the frequency of out-of-order state transition sequences as a function of load current in order to manage the rate at which the capacitor voltages come into balance. A load current detection and correction signal generation circuit 606 so is connected as to sense load current at the output of the DC-to-DC converter circuit 600 and generate a load correction (LC) signal. The LC signal may be applied to the clock and control circuit 602 to limit the generation of out-of-order state transition sequences as function of load current. For example, the LC signal may regulate (gate) the out-of-order state transition sequence counter referenced above to change the value of N such that low load current situations permit more out-of-order transition sequences per cycle, and high load current situations permit fewer out-of-order transition sequences per cycle. As should be appreciated, a number of different circuits may be used to adjust an out-of-order state transition sequence counter or the like up or down as a function of load current.

Regulating the frequency of out-of-order state transition sequences as a function of load current may be used with multi-level DC-to-DC converter circuits of any level, and may be used in conjunction with conventional multi-level DC-to-DC converter circuits as well as multi-level DC-to-DC converter circuits using boundary zone transitions (e.g., such as the state transition patterns shown in FIGS. 7A-7C).

In summary, various embodiments of the invention may include one or more of the following: limiting the total number of out-of-order state transition sequences per cycle; limiting the number of consecutive out-of-order state transition sequences; and/or limiting the number of out-of-order state transition sequences per cycle and/or consecutive out-of-order state transition sequences as a function of load.

Clock & Control Circuit Example

As one of ordinary skill in the art would appreciate, in light of the above disclosure, there are numerous ways of implementing the logic circuitry for boundary zone transitions, lossy capacitor voltage balancing, capacitor pre-charging during start-up, lossless capacitor voltage balancing, and/or state transition flow control. As one example, FIG. 11 is a schematic diagram of one embodiment of clock and control circuitry for a multi-level DC-to-DC converter circuit of the type shown in FIG. 6.

Figure 11:
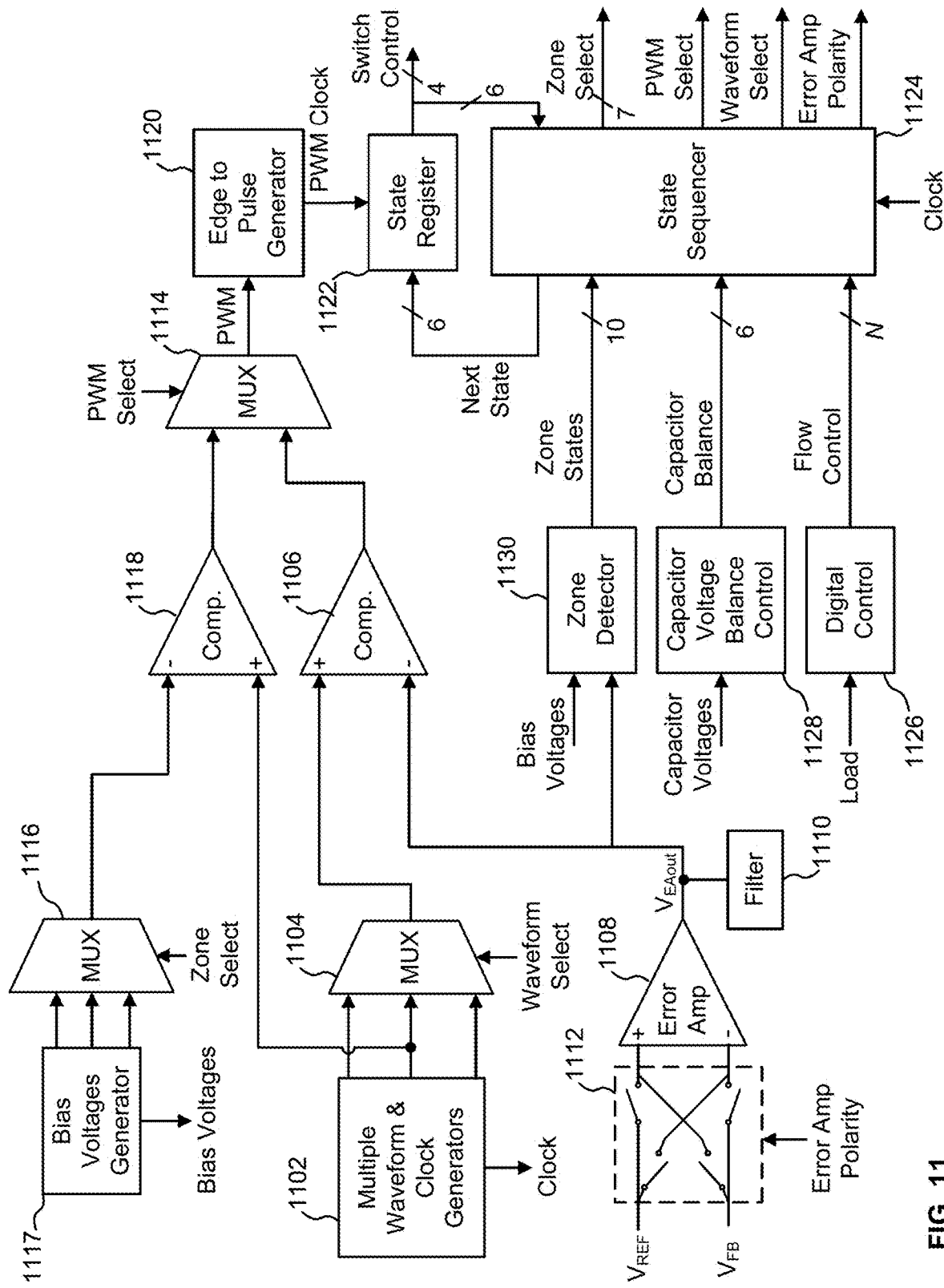
FIG. 11 is a schematic diagram of one embodiment of clock and control circuitry for a multi-level DC-to-DC converter circuit of the type shown in FIG. 6.

The clock and control circuitry of FIG. 11 includes multiple waveform and clock generators (for short, "generator circuit") 1102 coupled to the inputs of a first multiplexer 1104. In this example, the generator circuit 1102 outputs a system Clock and multiple triangular waveforms, any of which may be selected by the first multiplexer 1104 under the control of a Waveform Select signal. Note that while this example uses triangular waveforms, other waveforms, such as sawtooth, may be used for particular applications.

For fine control over duty cycle timing, the example circuit of FIG. 11 has two selectable pulse width modulation (PWM) clock signal pathways. In a first "error amp" pathway, used for both intra-zone (i.e., non-boundary zone) cases and boundary zone cases, the output of the first multiplexer 1104 is coupled to one input of a first comparator 1106, the other input of which is coupled to an error amplifier 1108. The inputs to the error amplifier 1108 are a reference voltage $V_{REF}$ and a feedback voltage $V_{FB}$ that is proportional to $V_2$. For example, in one embodiment, $V_{FB} = -\frac{1}{6}V_2$; accordingly, controlling $V_{REF}$ from 0 V to 2 V will enable setting $V_2$ from 0 V to −12 V. The reference voltage $V_{REF}$ need not be static, and may be, for example, dynamically set to obtain a desired value of $V_2$. The output voltage $V_{EAOut}$ of the error amplifier 1108 may be smoothed by a filter 1110 if needed and to provide for a stable closed-loop feedback circuit.

The reference voltage $V_{REF}$ and feedback voltage $V_{FB}$ are shown coupled to a "butterfly" switch 1112 that allows the inputs to the error amplifier 1108 to be swapped under the control of an Error Amp Polarity signal. In the illustrated embodiment, the Error Amp Polarity signal changes polarity when transitioning between sub-zones (e.g., from Zone 1-2_low to Zone 1-2_high, and vice versa).

The output voltage $V_{EAOut}$ of the error amplifier 1108 along with the selected triangular waveform from the first multiplexer 1104 feed into the first comparator 1106 to generate a PWM waveform that determines the proper duty cycle of the main output switches.

Figure 12:
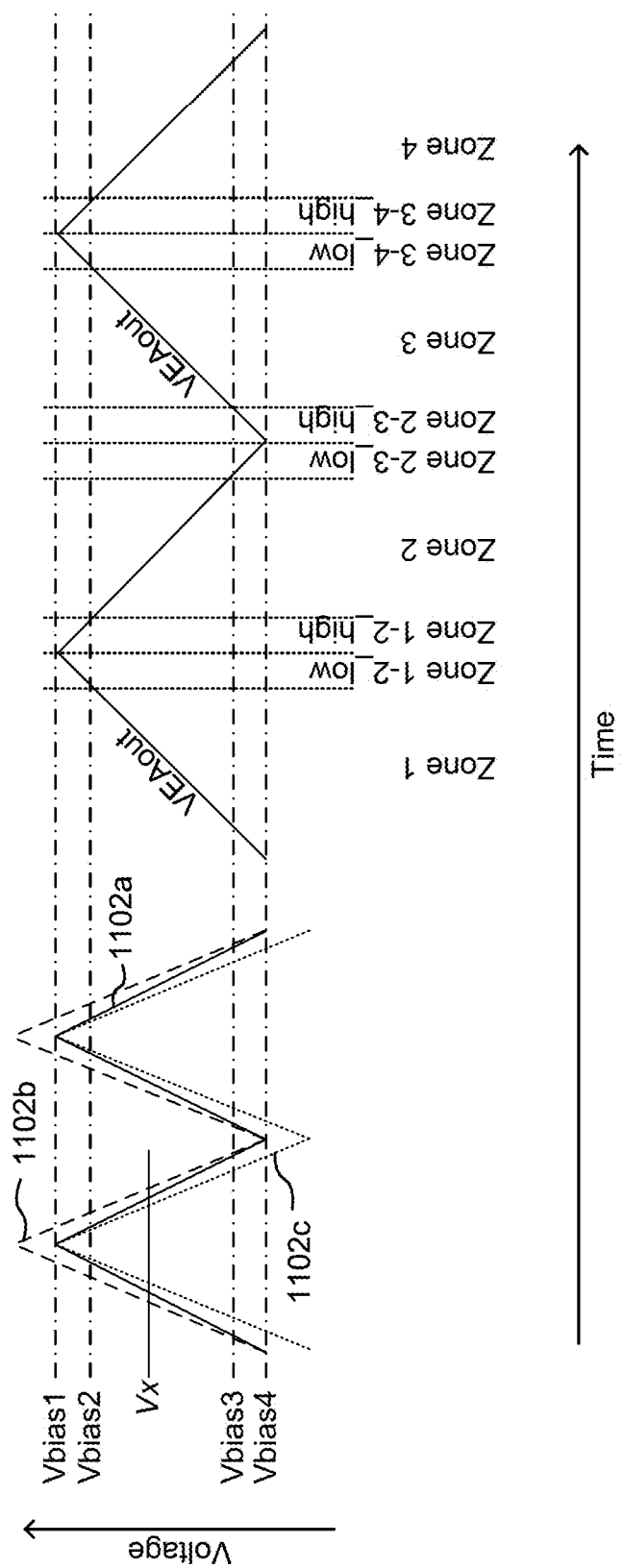
FIG. 12 is a timing diagram showing three triangular waveforms generated by the generator circuit of FIG. 11, plus zone transitions as a function of the error voltage $V_{EAOut}$ and various bias voltages.

For implementation of boundary zone transitions, it has been found useful to utilize multiple triangular waveforms of different peak voltages to generate the necessary PWM clock signals needed for dynamically altering duty cycles, particularly with respect to sub-zones. For example, FIG. 12 is a timing diagram showing three triangular waveforms 1102a, 1102b, 1102c generated by the generator circuit 1102 of FIG. 11, plus zone transitions as a function of the error voltage $V_{EAOut}$ and various bias voltages. As the examples show, the triangular waveforms 1102a, 1102b, 1102c each have a voltage above a settable threshold voltage of $V_X$ for different lengths of time. Thus, for a selected value of $V_X$, selecting waveform 1102b will result in a wider pulse than selecting waveform 1102a; similarly, selecting waveform 1102c will result in a narrower pulse than selecting waveform 1102a. For example, waveform 1102c may be used when a 6% duty cycle is needed for the multi-level DC-to-DC converter circuit, while waveform 1102b may be used when a 17% duty cycle is needed (see also the discussion of TABLES 4A and 4B above). As another example, waveform 1102b may be used when a 17% duty cycle is needed, while waveform 1102a may be used when 6% duty cycle is needed for the error amp pathway. As should be clear, the generator circuit 1102 and the first multiplexer 1104 may be configured to generate and select other numbers of multiple waveforms.

Switching between triangular waveform having different amplitudes enables essentially instantaneously change from wide to narrow pulse widths at zone boundaries when compared against the slow-moving error amp 1108 output voltage $V_{EAOut}$ and thus minimizes output voltage transient steps at the zone boundary transition point. For one example embodiment, waveforms 1102a and 1102b are used for Super-Zone 1-2 and for Super-Zone 3-4 when the error amp output voltage $V_{EAOut}$ is near a peak, whereas waveforms 1102a and 1102c are used for Super-Zone 2-3 when the error amp output voltage $V_{EAOut}$ is near a trough.

In a second "fixed bias" pathway, used for boundary zone cases, a second multiplexer 1116 is coupled to one input of a second comparator 1118, the other input of which is coupled to an output of the generator circuit 1102 (in this example, waveform 1102a from FIG. 12). The second multiplexer 1116 allows selection of one of a number of fixed bias voltages from a bias voltages generator 1117 to be applied to the second comparator 1118. The selected fixed bias, along with waveform 1102a, would generate a narrow pulse that is equivalent to the previously described boundary zone duty cycle (e.g., 6%) to control the main switches of a multi-level DC-to-DC converter circuit, thus setting a boundary-zone duty cycle value on a zone-by-zone basis. In the illustrated example, the fixed bias voltages correspond to the super-zones described above with respect to FIGS.

7A-7B (i.e., Super-Zones 1-2, 2-3, and 3-4). The fixed bias values may be chosen by calculation and then fine-tuned through simulation and/or calibration. Fine tuning the fixed bias voltages can adjust the fixed pulse width to minimize the output voltage transient step at boundary transitions within the super-zones.

The outputs of the first comparator 1106 and the second comparator 1118 are coupled to respective inputs of a third multiplexer 1114. The waveforms from the first comparator 1106 of the "error amp" pathway or from the second comparator 1118 of the "fixed bias" pathway are passed by the third multiplexer 1114 as a PWM signal to an edge-to-pulse generator 1120. In the illustrated embodiment, in non-boundary zone cases, the third multiplexer 1114 selects only the first comparator 1106 output and the first multiplexer 1104 is set to select only triangular waveform 1102a. In the boundary zones, the third multiplexer 1114 will toggle between the first comparator 1106 output and the second comparator 1118 output. More particularly, in the illustrated embodiment, the first multiplexer 1104 is set to select waveform 1102b for boundary zones 1-2 and 3-4. For boundary zone 2-3, the first multiplexer 1104 is set to select waveform 1102c. The second comparator 1118 always outputs a fixed pulse width. For boundary zones 1-2 and 3-4, Vbias2 (see FIG. 12) is selected by the second multiplexer 1116. Along with triangular waveform 1102a, the second comparator 1118 produces a small fixed pulse width. For boundary zone 2-3, Vbias3 (see FIG. 12) is selected by the second multiplexer 1116. Along with triangular waveform 1102a, the second comparator 1118 produces a narrow fixed pulse width.

Thus, only the "error amp" pathway would be used for determining duty cycles for operation of the multi-level DC-to-DC converter circuit. Outside of boundary zones, only the first comparator 1106 is selected by the third multiplexer 1114, so every PWM clock pulse is truly pulse width modulated (i.e., with variable pulse widths). However, inside the boundary zones, the circuit toggles between the "fixed bias" pathway and the "error amp" pathway. In the illustrated example, only every other clock pulse is truly pulse width modulated (i.e., the variable width pulse width that comes from the first comparator 1106), whereas the clock pulse that comes from the second comparator 1118 has a fixed pulse width.

In the illustrated embodiment, additional synchronization is required for boundary zones. For example, referring to FIG. 7A (and FIG. 7E, for Zone 1-2_low and Zone 1-2_high) state transitions take place among the super-zones with clock synchronization as indicated in the following list:
 For Zone 1-2_low, ST1-ST2 transitions are variable pulse width while ST2-ST3 transitions are fixed pulse width;
 For Zone 1-2_high, ST1-ST2 transitions are fixed pulse width while ST2-ST3 transitions are variable pulse width;
 For Zone 2-3_low, ST2-ST3 transitions are variable pulse width while ST3-ST4 transitions are fixed pulse width;
 For Zone 2-3_high, ST2-ST3 transitions are fixed pulse width while ST3-ST4 transitions are variable pulse width;
 For zone 3-4 low, ST3-ST4 transitions are variable pulse width while ST4-ST5 transitions are fixed pulse width;
 For zone 3-4 high, ST3-ST4 transitions are fixed pulse width while ST4-ST5 transitions are variable pulse width.

The edge-to-pulse generator 1120 converts each edge of the PWM waveform (either rising or falling edge) to a single small rising edge/falling edge pulse. The small pulse clock output of the edge-to-pulse generator 1120 clocks a rising-edge triggered state register 1122 for the determined duty cycle. The state register 1122 outputs Switch Control signals to the switches in the $V_1$ set of FIG. 6; complementary versions of the same signals are sent to the $V_2$ set of switches in FIG. 6 (inverters not shown). In the illustrated example, 4 bits of Switch Control signals are applied to the switches of a 5-level DC-to-DC inverting buck-boost converter circuit of the type shown in FIG. 6 or FIG. 8. An additional 2 bits are used to allow for the differentiation of the different states in Zone 1 and Zone 4, since all four Zone 1 states are "0000" and all four Zone 4 states are "1111"; differentiation using the extra 2 bits ensures that each of the four states can transition properly to a next Zone 2 or Zone 3 state.

A state machine 1124 coupled to the state register 1122 contains the logic for generating Next State bit sequences for the Switch Control signals in accordance with the logic described above for the various aspects of the present invention. The next state of the state machine 1124 will be generated depending not only on the present state but also on all the other inputs. The state machine 1124 may be implemented in combinatorial logic (including counters and registers), or as look-up tables, or a combination of combinatorial logic and look-up tables.

The state machine 1124 also outputs selection signals—Waveform Select, PWM Select, and Zone Select—for controlling respective multiplexers 1104, 1114, 1116. In addition, the state machine 1124 outputs the Error Amp Polarity signal described above. The Zone Select output from the state machine 1124 includes bits for selecting the sub-boundary zones and synchronizing zone transitions to the PWM clock (see TABLE 3 above).

One input to the state machine 1124 for determining the Next State is a set of N Flow Control signals from a digital control 1126 that specify, for example, limits on out-of-order state transitions. There may be any desired number of flow control lines to control the frequency of out-of-order state transitions. For example, referring to FIG. 10, there are a total of six groups of out-of-order state transitions for all zones. There is one group in Zone 1, as shown by left-to-right dash lines. In both Zone 2 and Zone 3, there are two groups: one group is shown by left-to-right dash lines, and another group is shown by right-to-left dash lines. In Zone 4, there is one group shown by right-to-left dash lines. Any of these six groups may be disabled independently in real time to further limit the frequency of out-of-order state transitions. To enable/disable these six groups, there would be 6 non-coded Flow Control signals. There may be additional Flow Control signals (coded or non-coded) to control how many consecutive out-of-order state transitions are allowed. As another example, one input to the digital control 1126 may be, for example, the load current at the output of the multi-level DC-to-DC converter circuit (if the load current input is in analog form, then the digital control 1126 may include an analog-to-digital converter subcircuit). Thus, the Flow Control signals may control the frequency of out-of-order state transitions so as to depend on the load current in order to manage the rate at which capacitor voltages come into balance.

Another input to the state machine 1124 is a set of Capacitor Balance signals from a capacitor voltage balance control 1128 that operates essentially like the voltage detection and correction signal generation circuit 804 of FIG. 8 to constantly sense the capacitor voltages and generate corresponding correction signals. The correction signals have an "UP" (e.g., $Cx^{\wedge}$) or "DOWN" (e.g., $Cx_{\vee}$) value that is used to steer the Next State value output by the state machine 1124 for lossless capacitor voltage balancing, as described above.

Another input to the state machine 1124 is a set of Zone State signals from a zone detector 1130, which is essentially a comparator. The inputs to the zone detector 1130 are the output voltage $V_{EAOut}$ of the error amplifier 1108, and the bias voltages from the bias voltages generator 1117. The zone detector 1130 compares the analog input voltages to determine the actual current zone or sub-zone, and generates digital control signals that specify the current zone state (see, for example, the zone states in TABLE 5 above).

For the example circuit of FIG. 11, and referring to the zone transitions as a function of the error voltage $V_{EAOut}$ and various bias voltages shown in FIG. 12, at start-up, the output voltage $V_2$ is at 0 V, which is in Zone 1. The reference voltage $V_{REF}$ will slowly ramp up to its target voltage setting; accordingly, $V_{EAOut}$ starts low. As $V_2$ decreases toward a more negative voltage, $V_{EAOut}$ increases. Meanwhile, $V_{REF}$ is compared to the feedback voltage $V_{FB}$; as noted above, in the illustrated example, $V_{FB}=V_2$. Once $V_{FB}$ reaches $V_{REF}$, the output voltage would have reached the target. In the meantime, $V_{EAOut}$ is continuously compared to the bias voltages from the bias voltages generator 1117 by the zone detector 1130. Once $V_{EAOut}$ reaches the 6%/94% point of waveform 1102a (e.g., Vbias2) in FIG. 12, the zone state transitions from Zone 1 to Zone 1-2_low. $V_{EAOut}$ will keep increasing and once $V_{EAOut}$ reaches the 6%/94% point of waveform 1102b (e.g., Vbias1), the zone state transitions from Zone 1-2_low to Zone 1-2_high and the error amp polarity reverses, which causes $V_{EAOut}$ to start to decrease. Once $V_{EAOut}$ reaches the 6%/94% point of waveform 1102a (e.g., Vbias2), the zone state transitions from Zone 1-2_high to Zone 2. Similarly, once $V_{EAOut}$ reaches the 94%/6% point of waveform 1102a (e.g., Vbias3), the zone state transitions from Zone 2 to Zone 2-3_low. Once $V_{EAOut}$ reaches the 94%/6% point of waveform 1102c (e.g., Vbias4), the zone state transitions from Zone 2-3_low to Zone 2-3_high.

This particular process can keep going all the way to Zone 4 if the final $V_{REF}$ voltage corresponds to Zone 4; that is, the circuit will always start from 0 V, proceed into Zone 1, and go through adjacent zones until reaching the target zone. Once the target zone is reached, if $V_{REF}$ changes either up or down, zone state changes would occur accordingly, noting that zone states always move between adjacent zones and do not jump Zones.

Note that if there is enough error amp output voltage dynamic range, there need not be any error amp polarity reversals. For example, if the error amp output linear range can go from 1 V to 8 V, one can simply subdivide the 7 V range into zones (e.g., 1, 1-2, 2, 2-3, 3, 3-4, and 4), and use appropriate bias voltages for the demarcation.

Applications

DC-to-DC converter circuits in accordance with the present invention may be used alone or in combination with other components, circuits, and devices. Embodiments of the present invention may be fabricated in whole or in part (e.g., with off-chip inductors and/or capacitors) as integrated circuits (ICs), which may be encased in IC packages and/or or modules for ease of handling, manufacture, and/or improved performance.

Embodiments of the present invention are useful in a wide variety of larger radio frequency (RF) circuits and systems, such as display drivers, radar systems (including phased array and automotive radar systems), radio systems (including cellular radio systems), and test equipment. Such circuits may be useful in systems operating over some or all of the RF range (e.g., from about 3 kHz to about 300 GHz).

Radio system usage includes wireless RF systems (including base stations, relay stations, and hand-held transceivers) that use various technologies and protocols, including various types of orthogonal frequency-division multiplexing ("ODFM"), quadrature amplitude modulation ("QAM"), Code Division Multiple Access ("CDMA"), Wide Band Code Division Multiple Access ("W-CDMA"), Worldwide Interoperability for Microwave Access ("WIMAX"), Global System for Mobile Communications ("GSM"), Enhanced Data Rates for GSM Evolution (EDGE), Long Term Evolution ("LTE"), 5G New Radio (NR), as well as other radio communication standards and protocols.

A wireless device may be capable of communicating with multiple wireless communication systems using one or more of the telecommunication protocols noted above. A wireless device also may be capable of communicating with one or more satellites, such as navigation satellites (e.g., GPS) and/or telecommunication satellites. A wireless device may be a cellular phone, a personal digital assistant (PDA), a wireless-enabled computer or tablet, or some other wireless communication unit or device. A wireless device may also be referred to as a mobile station, user equipment, an access terminal, or some other terminology.

Figure 13:
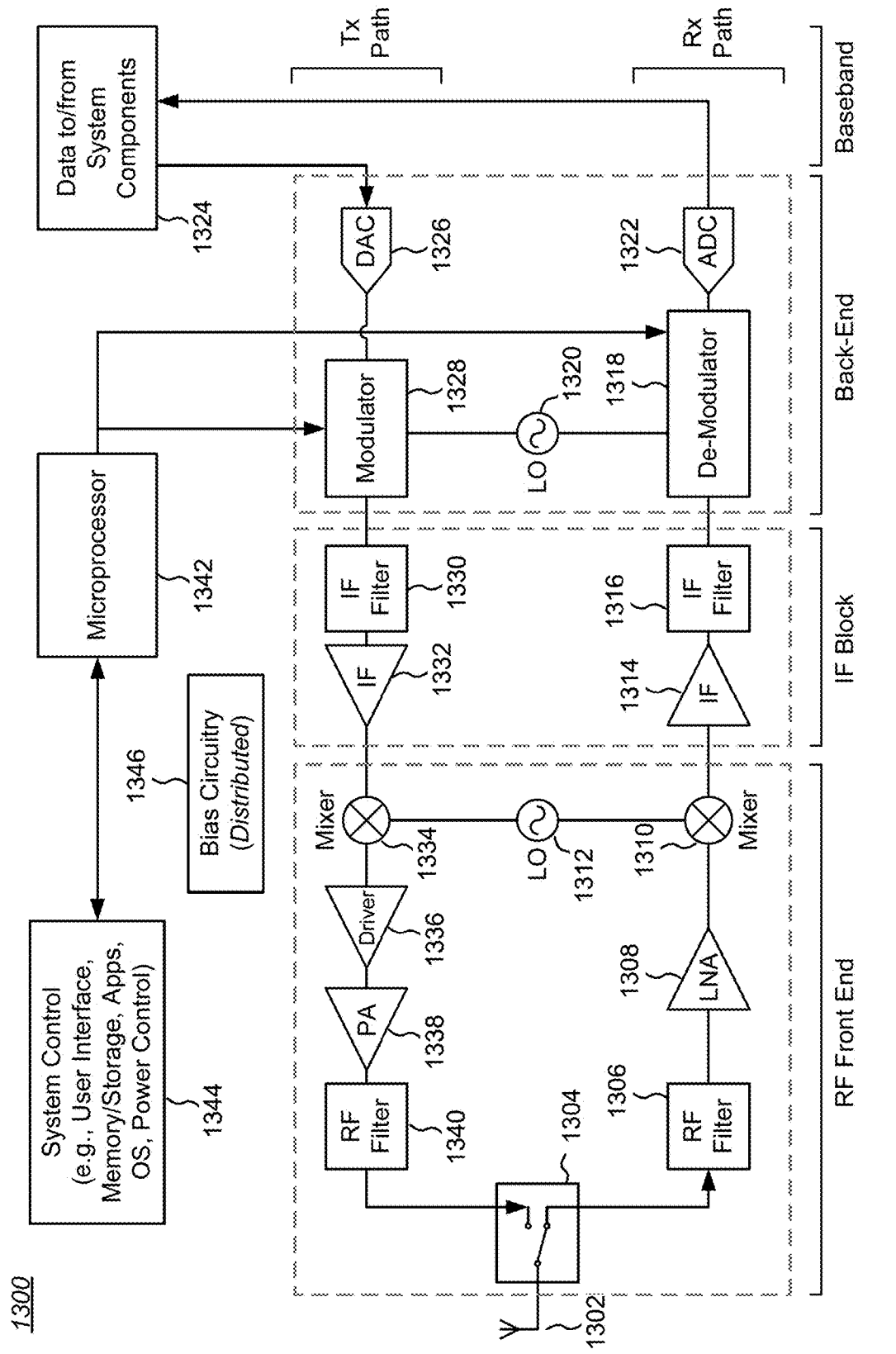
FIG. 13 is a block diagram of a typical prior art transceiver that might be used in a wireless device, such as a cellular telephone.

As an example of a system in which the present invention may be used to provide various different DC voltage levels from a DC source, FIG. 13 is a block diagram of a typical prior art transceiver 1300 that might be used in a wireless device, such as a cellular telephone. As illustrated, the transceiver 1300 includes a mix of RF analog circuitry for directly conveying and/or transforming signals on an RF signal path, non-RF analog circuitry for operational needs outside of the RF signal path (e.g., for bias voltages and switching signals), and digital circuitry for control and user interface requirements. In this example, a receiver path Rx includes RF Front End, IF Block, Back-End, and Baseband sections (noting that in some implementations, the differentiation between sections may be different).

The receiver path Rx receives over-the-air RF signals through an antenna 1302 and a switching unit 1304, which may be implemented with active switching devices (e.g., field effect transistors or FETs), or with passive devices that implement frequency-domain multiplexing, such as a diplexer or duplexer. An RF filter 1306 passes desired received RF signals to a low noise amplifier (LNA) 1308, the output of which is combined in a mixer 1310 with the output of a first local oscillator 1312 to produce an intermediate frequency (IF) signal. The IF signal may be amplified by an IF amplifier 1314 and subjected to an IF filter 1316 before being applied to a demodulator 1318, which may be coupled to a second local oscillator 1320. The demodulated output of the demodulator 1318 is transformed to a digital signal by an analog-to-digital converter 1322 and provided to one or more system components 1324 (e.g., a display driver for a visual display (LED, OLED, LCD, etc.), a video graphics circuit, a sound circuit, memory devices, etc.). The converted digital signal may represent, for example, video or still images, sounds, or symbols, such as text or other characters.

In the illustrated example, a transmitter path Tx includes Baseband, Back-End, IF Block, and RF Front End sections (again, in some implementations, the differentiation between sections may be different). Digital data from one or more system components 1324 is transformed to an analog signal by a digital-to-analog converter 1326, the output of which is applied to a modulator 1328, which also may be coupled to the second local oscillator 1320. The modulated output of the modulator 1328 may be subjected to an IF filter 1330 before being amplified by an IF amplifier 1332. The output of the IF amplifier 1332 is then combined in a mixer 1334 with the output of the first local oscillator 1312 to produce an RF signal. The RF signal may be amplified by a driver 1336, the output of which is applied to a power amplifier (PA) 1338. The amplified RF signal may be coupled to an RF filter 1340, the output of which is coupled to the antenna 1302 through the switching unit 1304. The operation of the transceiver 1300 is controlled by a microprocessor 1342 in known fashion, which interacts with system control components (e.g., user interfaces, memory/storage devices, application programs, operating system software, power control, etc.). In addition, the transceiver 1300 will generally include other circuitry, such as bias circuitry 1346 (which may be distributed throughout the transceiver 1300 in proximity to transistor devices), electro-static discharge (ESD) protection circuits, testing circuits (not shown), factory programming interfaces (not shown), etc. In modern transceivers, there are often more than one receiver path Rx and transmitter path Tx, for example, to accommodate multiple frequencies and/or signaling modalities. Further, as should be apparent to one of ordinary skill in the art, some components of the transceiver 1300 may be in a positioned in a different order (e.g., filters) or omitted. Other components can be (and usually are) added (e.g., additional filters, impedance matching networks, variable phase shifters/attenuators, power dividers, etc.).

Methods

Figure 14:
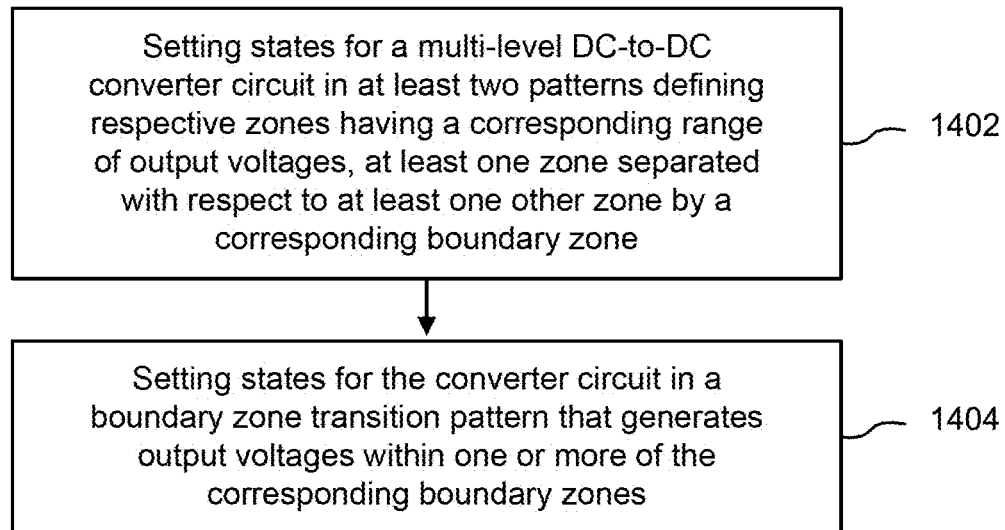
FIG. 14 is a process flow diagram of one method of generating a full range of output voltages in a multi-level DC-to-DC converter circuit for converting an input voltage to an output voltage.

Another aspect of the invention includes methods of generating a full range of output voltages in a multi-level DC-to-DC converter circuit for converting an input voltage to an output voltage. For example, FIG. 14 is a process flow diagram 1400 of one method of generating a full range of output voltages in a multi-level DC-to-DC converter circuit for converting an input voltage to an output voltage. The method includes: setting states for the converter circuit in at least two patterns defining respective zones having a corresponding range of output voltages, at least one zone separated with respect to at least one other zone by a corresponding boundary zone (Block 1402); and setting states for the converter circuit in a boundary zone transition pattern that generates output voltages within one or more of the corresponding boundary zones (Block 1404).

The above method, and corresponding circuits for implementing such method, may include one or more of the following: wherein the boundary zone transition pattern alternates between state transitions within a first one of the zones and state transitions within a second one of the zones; wherein the boundary zone transition pattern comprises a plurality of state transitions encoded in a reflected binary code; wherein the patterns defining zones have respective zone duty cycles, and the boundary zone transition pattern for the boundary zone between the zones includes a first sub-zone having a first combination of duty cycles, and a second sub-zone having a second combination of duty cycles, the first and second combinations of duty-cycles differing from the zone duty cycles; and/or selecting the first and second combinations of duty-cycles to cause an average output voltage at the transition between each zone and the boundary zone to approximately match an output voltage in the zone and near the boundary zone.

Figure 15:
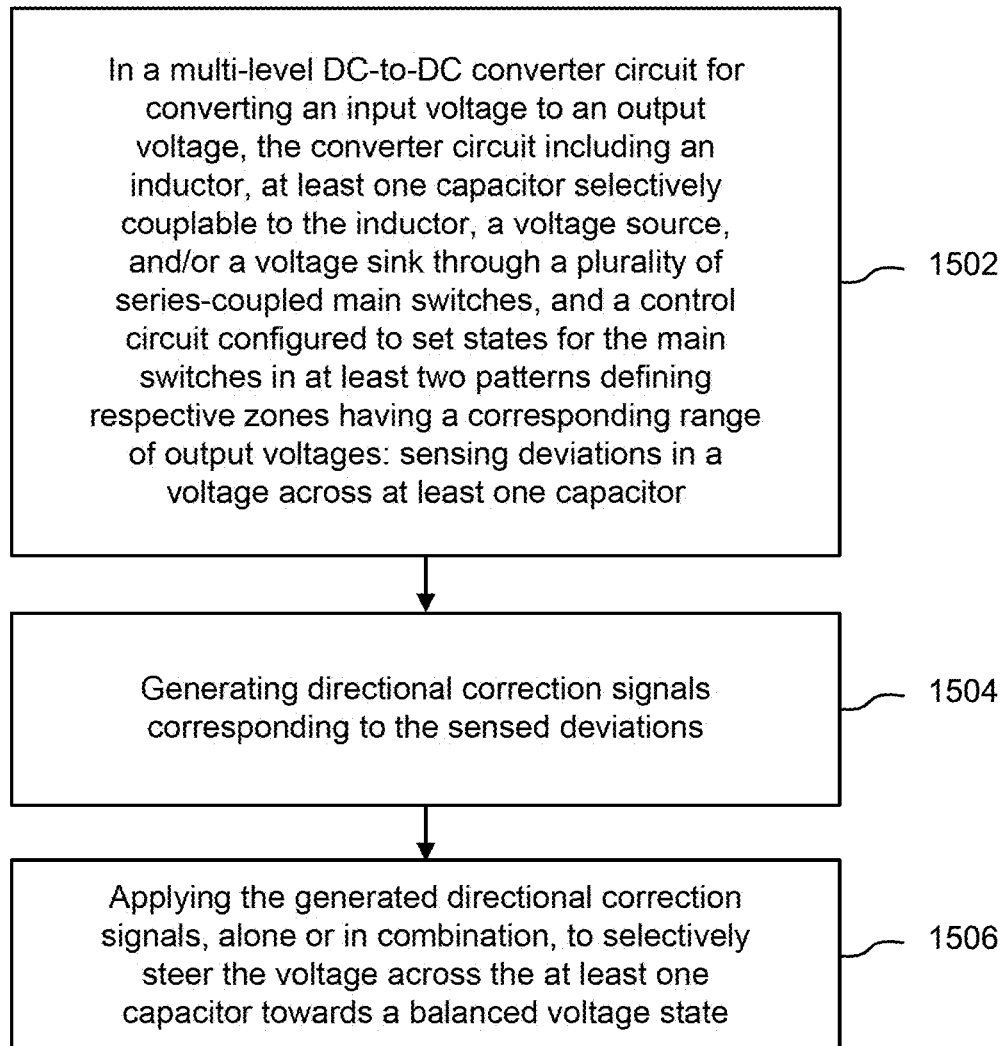
FIG. 15 is a process flow diagram of a first method of balancing capacitor voltages in a multi-level DC-to-DC converter circuit for converting an input voltage to an output voltage.

Another aspect of the invention includes methods for balancing capacitor voltages in a multi-level DC-to-DC converter circuit. For example, FIG. 15 is a process flow diagram 1500 of a first method of balancing capacitor voltages in a multi-level DC-to-DC converter circuit for converting an input voltage to an output voltage. In this example, the converter circuit includes an inductor, at least one capacitor selectively couplable to the inductor, a voltage source, and/or a voltage sink through a plurality of series-coupled main switches, and a control circuit configured to set states for the main switches in at least two patterns defining respective zones having a corresponding range of output voltages. The method includes: sensing deviations in a voltage across at least one capacitor (Block 1502); generating directional correction signals corresponding to the sensed deviations (Block 1504); and applying the generated directional correction signals, alone or in combination, to selectively steer the voltage across the at least one capacitor towards a balanced voltage state (Block 1506).

The above method, and corresponding circuits for implementing such method, may include one or more of the following: applying the generated directional correction signals, alone or in combination, to selectively steer the voltage across the at least one capacitor towards a balanced voltage state by coupling one or more capacitors to a source voltage to charge such one or more capacitors, and/or coupling two or more capacitors together to transfer charge from a higher voltage capacitor to a lower voltage capacitor, and/or coupling one or more capacitors to a voltage sink to discharge such one or more capacitors; wherein the main switches include a field effect transistor; wherein the multi-level DC-to-DC converter circuit is one of a buck-boost or a boost or a buck multi-level DC-to-DC converter circuit; wherein the multi-level DC-to-DC converter circuit is one of a 3-level or a 4-level or a 5-level DC-to-DC converter circuit; sensing deviations in a voltage across at least one capacitor, generating directional correction signals corresponding to the sensed deviations, and applying the generated directional correction signals, alone or in combination, during a pre-charge period so as to selectively steer the voltage across the at least one capacitor to charge the at least one capacitor to a corresponding selected initial voltage; and/or wherein each zone is separated with respect to at least one other zone by a boundary zone, further including configuring the control circuit to set states for the main switches in a boundary zone transition pattern that generates output voltages within one or more of the boundary zones.

Figure 16:
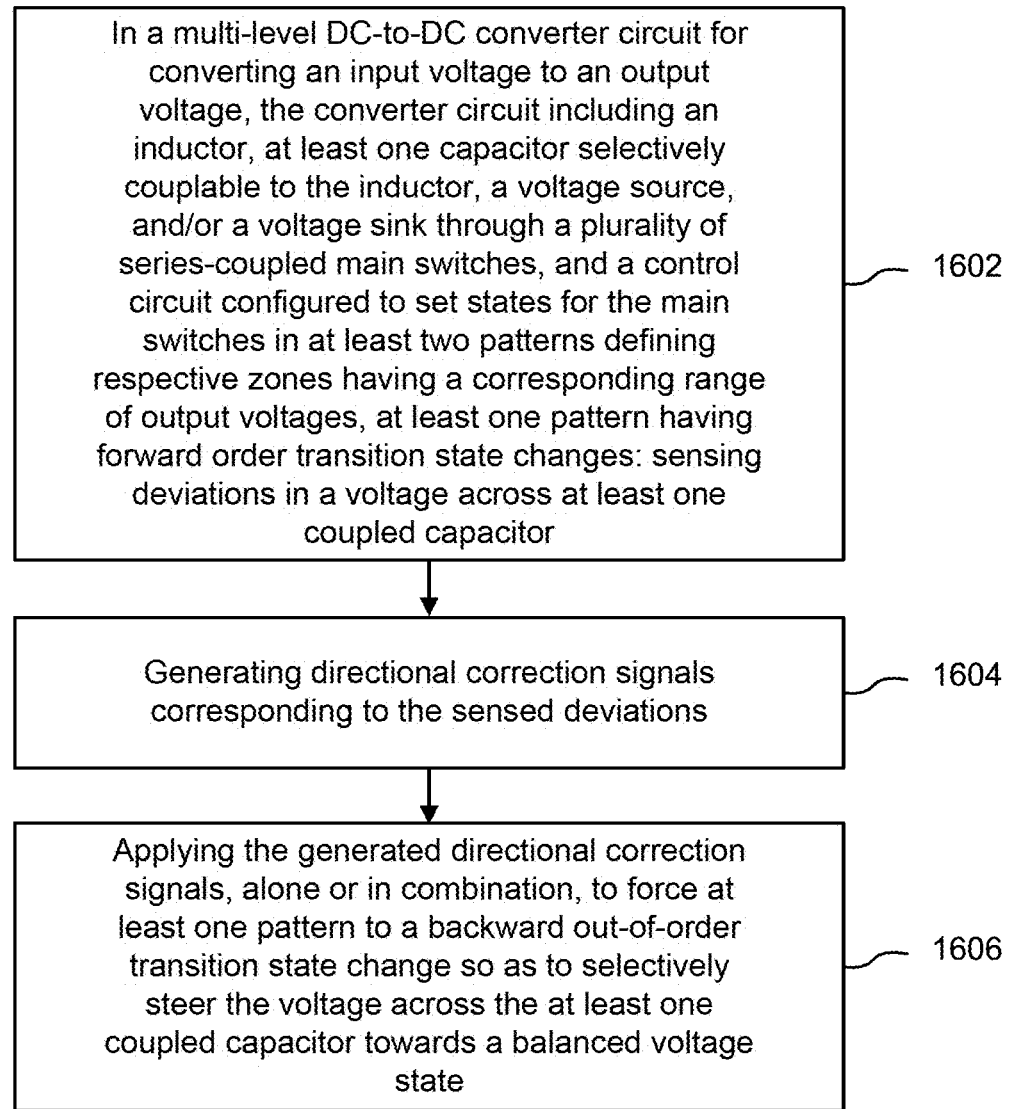
FIG. 16 is a process flow diagram of a second method of balancing capacitor voltages in a multi-level DC-to-DC converter circuit for converting an input voltage to an output voltage.

As another example, FIG. 16 is a process flow diagram 1600 of a second method of balancing capacitor voltages in a multi-level DC-to-DC converter circuit for converting an input voltage to an output voltage. In this example, the converter circuit includes an inductor, at least one capacitor selectively couplable to the inductor, a voltage source, and/or a voltage sink through a plurality of series-coupled switches, and a control circuit configured to set states for the switches in at least two patterns defining respective zones each defining a corresponding range of output voltages, at least one pattern having forward order transition state changes. The method includes: sensing deviations in a voltage across at least one coupled capacitor (Block 1602); generating directional correction signals corresponding to the sensed deviations (Block 1604); and applying the generated directional correction signals, alone or in combination, to force at least one pattern to a backward out-of-order transition state change so as to selectively steer the voltage across the at least one coupled capacitor towards a balanced voltage state (Block 1606).

The above method, and corresponding circuits for implementing such method, may include one or more of the following: wherein the switches include a field effect transistor; wherein the multi-level DC-to-DC converter circuit is one of a buck-boost or a boost or a buck multi-level DC-to-DC converter circuit; wherein the multi-level DC-to-DC converter circuit is one of a 3-level or a 4-level or a 5-level DC-to-DC converter circuit; wherein each pattern consists of a cycle of forward order transition state changes, further including limiting backward out-of-order of transition state changes to a selected number per cycle; wherein each pattern consists of a cycle of forward order transition state changes, further including limiting consecutive backward out-of-order of transition state changes to a selected number per cycle; wherein each pattern consists of a cycle of forward order transition state changes, further including limiting backward out-of-order of transition state changes to a selected number per cycle as a function of an electrical load on the multi-level DC-to-DC converter circuit; wherein each pattern consists of a cycle of forward order transition state changes, further including limiting consecutive backward out-of-order of transition state changes to a selected number per cycle as a function of an electrical load on the multi-level DC-to-DC converter circuit; and/or wherein each zone is separated with respect to at least one other zone by a boundary zone, further including configuring the control circuit to set states for the switches in a boundary zone transition pattern that generates output voltages within one or more of the boundary zones.

Fabrication Technologies & Options

The term "MOSFET", as used in this disclosure, means any field effect transistor (FET) with an insulated gate and comprising a metal or metal-like, insulator, and semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this specification, the term "radio frequency" (RF) refers a rate of oscillation in the range of about 3 kHz to about 300 GHz. This term also includes the frequencies used in wireless communication systems. An RF frequency may be the frequency of an electromagnetic wave or of an alternating current in a circuit.

As should be readily apparent to one of ordinary skill in the art, various embodiments of the invention can be implemented to meet a wide variety of specifications. For example, it is expressly contemplated that any and all combinations of one or more of the inventions and/or methods described above and/or set forth in the claims may be made and utilized to meet the requirements of particular applications.

Unless otherwise noted above, selection of suitable component values is a matter of design choice and various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, silicon-on-insulator (SOI), and silicon-on-sapphire (SOS). Unless otherwise noted above, the invention may be implemented in other transistor technologies such as bipolar, GaAs HBT, GaN HEMT, GaAs pHEMT, and MESFET technologies. However, the inventive concepts described above are particularly useful with an SOI-based fabrication process (including SOS), and with fabrication processes having similar characteristics. Fabrication in CMOS on SOI or SOS processes enables circuits with low power consumption, the ability to withstand high power signals during operation due to FET stacking, good linearity, and high frequency operation (i.e., radio frequencies up to and exceeding 50 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

CONCLUSION

A number of embodiments of the invention have been described. It is to be understood that various modifications may be made without departing from the scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

The invention claimed is:

1. A converter circuit for converting an input voltage to an output voltage, including:
    (a) a multi-level converter circuit including at least four switches, at least one capacitor, and at least one inductor;
    (b) a switched resistance network, coupled to the at least one capacitor and to at least one switch of the at least four switches; and
    (c) a directional correction circuit, coupled to the at least one capacitor and to the switched resistance network, configured to sense deviations in a voltage across at least one coupled capacitor and generate directional correction signals to the switched resistance network that, alone or in combination, dynamically change a pattern of charge or discharge states for the at least one coupled capacitor to selectively steer the voltage across the at least one coupled capacitor towards a balanced voltage state.

2. The invention of claim 1, wherein the directional correction signals control the switched resistance network to select at least one capacitor of the at least one capacitor, and conditionally charge or discharge the at least one selected capacitor.

3. The invention of claim 1, wherein the directional correction signals control the switched resistance network to select at least one capacitor of the at least one capacitor, and conditionally couple two or more selected capacitor capacitors together to transfer charge from a higher voltage selected capacitor to a lower voltage selected capacitor.

4. The invention of claim 1, wherein the directional correction signals control the switched resistance network to select at least one capacitor of the at least one capacitor, and conditionally charge or discharge the at least one selected capacitor, or conditionally couple two or more selected capacitors together to transfer charge from a higher voltage selected capacitor to a lower voltage selected capacitor.

5. The invention of claim 1, wherein the converter circuit is one of a buck-boost or a boost or a buck converter circuit.

6. The invention of claim 1, wherein the converter circuit is one of a 3-level or a 4-level or a 5-level DC-to-DC converter circuit.

7. The invention of claim 1, wherein the directional correction circuit and the switched resistance network are activated during a pre-charge period to charge at least one coupled capacitor to a corresponding selected initial voltage.

8. A controller configured to be coupled to (1) a multi-level power converter circuit that includes at least four switches, at least one capacitor, and at least one inductor, and (2) a switched resistance network, coupled to the at least one capacitor and to at least one switch of the at least four switches, wherein the controller is configured to sense deviations in a voltage across at least one capacitor in the multi-level power converter circuit and generate directional correction signals to the switched resistance network that, alone or in combination, dynamically change a pattern of charge or discharge states for the at least one capacitor to selectively steer the voltage across the at least one capacitor towards a balanced voltage state.

9. The invention of claim 8, wherein the directional correction signals control the switched resistance network to select at least one capacitor of the at least one capacitor, and conditionally charge or discharge the at least one selected capacitor.

10. The invention of claim 8, wherein the directional correction signals control the switched resistance network to select at least one capacitor of the at least one capacitor, and conditionally couple two or more selected capacitor capacitors together to transfer charge from a higher voltage selected capacitor to a lower voltage selected capacitor.

11. The invention of claim 8, wherein the directional correction signals control the switched resistance network to select at least one capacitor of the at least one capacitor, and conditionally charge or discharge the at least one selected capacitor, or conditionally couple two or more selected capacitors together to transfer charge from a higher voltage selected capacitor to a lower voltage selected capacitor.

12. The invention of claim 8, wherein the controller may be activated during a pre-charge period to charge at least one capacitor in the multi-level power converter circuit to a corresponding selected initial voltage.

13. A multi-level DC-to-DC converter circuit for converting an input voltage to an output voltage, including:
(a) a plurality of main switches;
(b) an inductor coupled to a node within the plurality of main switches;
(c) at least one capacitor coupled to at least some of the plurality of main switches and selectively couplable through the plurality of main switches to the inductor and/or a voltage source and/or a voltage sink;
(d) a control circuit coupled to the main switches and configured to set states for the main switches;
(e) a switched resistance network, coupled to at least one capacitor and to at least one main switch; and
(f) a directional correction circuit, coupled to at least one capacitor and to the switched resistance network, and configured to sense deviations in a voltage across at least one coupled capacitor and generate corresponding directional correction signals to the switched resistance network that, alone or in combination, dynamically change a pattern of charge or discharge states for the at least one coupled capacitor to selectively steer the voltage across the at least one coupled capacitor towards a balanced voltage state.

14. The invention of claim 13, wherein the directional correction signals control the switched resistance network to conditionally couple one or more capacitors to a voltage source to charge such one or more capacitors and/or conditionally couple one or more capacitors to a voltage sink to discharge such one or more capacitors.

15. The invention of claim 13, wherein the directional correction signals control the switched resistance network to conditionally couple two or more capacitors together to transfer charge from a higher voltage capacitor to a lower voltage capacitor.

16. The invention of claim 13, wherein the directional correction signals control the switched resistance network to conditionally couple one or more capacitors to a voltage source to charge such one or more capacitors, and/or conditionally couple two or more capacitors together to transfer charge from a higher voltage capacitor to a lower voltage capacitor, and/or conditionally couple one or more capacitors to a voltage sink to discharge such one or more capacitors.

17. The invention of claim 13, wherein the multi-level DC-to-DC converter circuit is one of a buck-boost or a boost or a buck multi-level DC-to-DC converter circuit.

18. The invention of claim 13, wherein the multi-level DC-to-DC converter circuit is one of a 3-level or a 4-level or a 5-level DC-to-DC converter circuit.

19. The invention of claim 13, wherein the directional correction circuit and the switched resistance network are activated during a pre-charge period to charge at least one coupled capacitor to a corresponding selected initial voltage.

* * * * *